United States Patent
Du et al.

(10) Patent No.: US 11,946,753 B2
(45) Date of Patent: *Apr. 2, 2024

(54) GENERATING DIGITAL EVENT RECOMMENDATION SEQUENCES UTILIZING A DYNAMIC USER PREFERENCE INTERFACE

(71) Applicant: Adobe Inc., San Jose, CA (US)

(72) Inventors: Fan Du, Santa Clara, CA (US); Sana Malik Lee, Cupertino, CA (US); Georgios Theocharous, San Jose, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/364,480

(22) Filed: Jun. 30, 2021

(65) Prior Publication Data

US 2021/0325193 A1 Oct. 21, 2021

Related U.S. Application Data

(63) Continuation of application No. 16/047,908, filed on Jul. 27, 2018, now Pat. No. 11,085,777.

(51) Int. Cl.
*H04W 4/024* (2018.01)
*G01C 21/34* (2006.01)
(Continued)

(52) U.S. Cl.
CPC ....... *G01C 21/343* (2013.01); *G01C 21/3476* (2013.01); *G01C 21/3484* (2013.01);
(Continued)

(58) Field of Classification Search
None
See application file for complete search history.

(56) References Cited

U.S. PATENT DOCUMENTS 7,853,622 B1 12/2010 Baluja et al.
8,239,418 B1 8/2012 Baluja et al.
(Continued)

FOREIGN PATENT DOCUMENTS

AU 2012378630 A1 * 9/2014 ............. G06Q 10/00
CN 107463701 A * 12/2017 ......... G06F 16/9535
(Continued)

OTHER PUBLICATIONS

Dietterich, Thomas G. "Machine learning for sequential data: A review." Joint IAPR international workshops on statistical techniques in pattern recognition (SPR) and structural and syntactic pattern recognition (SSPR). Springer, Berlin, Heidelberg, 2002. (Year: 2002).*

(Continued)

*Primary Examiner* — Thomas L Mansfield
(74) *Attorney, Agent, or Firm* — Keller Preece PLLC

(57) ABSTRACT

The present disclosure relates to generating and modifying recommended event sequences utilizing a dynamic user preference interface. For example, in one or more embodiments, the system generates a recommended event sequence using a recommendation model trained based on a plurality of historical event sequences. The system then provides, for display via a client device, the recommendation, a plurality of interactive elements for entry of user preferences, and a visual representation of historical event sequences. Upon detecting input of user preferences, the system can modify a reward function of the recommendation model and provide a modified recommended event sequence together with the plurality of interactive elements. In one or more embodiments, as a user enters user preferences, the system additionally modifies the visual representation to display subsets of the plurality of historical event sequences corresponding to the preferences.

20 Claims, 11 Drawing Sheets

(51) Int. Cl.
*G06Q 10/047* (2023.01)
*H04W 4/021* (2018.01)

(52) U.S. Cl.
CPC .......... *G06Q 10/047* (2013.01); *H04W 4/021* (2013.01); *H04W 4/024* (2018.02)

(56) References Cited

U.S. PATENT DOCUMENTS

| | | | |
|---|---|---|---|
| 10,115,146 | B1 | 10/2018 | Anderson et al. |
| 10,740,824 | B2 | 8/2020 | Becker et al. |
| 2012/0323938 | A1 | 12/2012 | Skeen et al. |
| 2012/0330693 | A1* | 12/2012 | Ciabrini ............. G06Q 50/14 705/26.7 |
| 2014/0351079 | A1 | 11/2014 | Dong et al. |
| 2016/0156951 | A1* | 6/2016 | Perinchery ......... H04N 21/4334 725/14 |
| 2017/0329572 | A1* | 11/2017 | Shah ................ H04N 21/40 |
| 2019/0287151 | A1* | 9/2019 | Becker .............. G06Q 30/0631 |

FOREIGN PATENT DOCUMENTS

| | | | | |
|---|---|---|---|---|
| CN | 108604178 A | * | 9/2018 | ............. G06F 1/169 |
| EP | 3540606 A1 | * | 9/2019 | ....... G06F 16/24552 |
| JP | 4777583 B2 | * | 9/2011 | ........... H04N 19/132 |

OTHER PUBLICATIONS

Henderson, Matthew. "Machine learning for dialog state tracking: A review." (2015). (Year: 2015).*
Kotsiantis, Sotiris B., Ioannis Zaharakis, and P. Pintelas. "Supervised machine learning: A review of classification techniques." Emerging artificial intelligence applications in computer engineering 160.1 (2007): 3-24. (Year: 2007).*
Glimcher, Paul W. "Understanding dopamine and reinforcement learning: the dopamine reward prediction error hypothesis." Proceedings of the National Academy of Sciences 108.supplement_3 (2011): 15647-15654. (Year: 2011).*
B. Alsallakh, A. Hanbury, H. Hauser, S. Miksch, and A. Rauber. 2014. Visual methods for analyzing probabilistic classification data. IEEE Trans. Vis. Comput. Graph. 20, 12 (2014), 1703-1712.
S. Bostandjiev, J. O'Donovan, and T. Höllerer. 2012. TasteWeights: A visual interactive hybrid recommender system. In Proc. of the ACM Conf on Rec. Sys. 35-42.
F. Du, C. Plaisant, N. Spring, and B. Shneiderman. 2017. Finding Similar People to Guide Life Choices: Challenge, Design, and Evaluation. In Proc. of SIGCHI Conf. on Human Factors in Comp. Sys. 5498-5509.
J. Krause, A. Perer, and K. Ng. 2016. Interacting with predictions: Visual inspection of black-box machine learning models. In Proc. of SIGCHI Conf. on Human Factors in Comp. Sys. 5686-5697.
S. McGregor, H. Buckingham, T.G. Dietterich, R. Houtman, C. Montgomery, and R. Metoyer. 2016. Interactive visualization for testing Markov Decision Processes: MDPvis. J of Vis. Lang. & Comp. (2016).
G. Theocharous, N. Vlassis, and Z. Wen. 2017. An interactive points of interest guidance system. In Proceedings of the International Conference on Intelligent User Interfaces Companion. 49-52.
B. Thomee, D.A. Shamma, G. Friedland, B. Elizalde, K. Ni, D. Poland, D. Borth, and L. Li. 2016. YFCC100M: The new data in multimedia research. Commun. ACM 59, 2 (2016), 64-73.
W.R. Thompson. 1933. On the likelihood that one unknown probability exceeds another in view of the evidence of two samples. Biometrika 25, 3/4 (1933), 285-294.
Paul D Thompson Consultant & Michael B Johnson (2005) "Markovian bridge deterioration: developing models from historical data, Structure and Infrastructure Engineering", 1:1, 85-91, DOI: 10.1080/15732470412331289332 (Year: 2005) [abstract only].
U.S. Appl. No. 16/047,908, Mar. 26, 2020, Preinterview 1st Office Action.
U.S. Appl. No. 16/047,908, May 20, 2020, First Action Interview Office Action.
U.S. Appl. No. 16/047,908, Sep. 10, 2020, Office Action.
U.S. Appl. No. 16/047,908, Dec. 17, 2020, Office Action.
U.S. Appl. No. 16/047,908, Apr. 14, 2021, Notice of Allowance.

* cited by examiner

GENERATING DIGITAL EVENT RECOMMENDATION SEQUENCES UTILIZING A DYNAMIC USER PREFERENCE INTERFACE

CROSS-REFERENCE TO RELATED APPLICATIONS

The present application is a continuation of U.S. application Ser. No. 16/047,908, filed on Jul. 27, 2018. The aforementioned application is hereby incorporated by reference in its entirety.

BACKGROUND

Recent years have seen significant improvement in hardware and software platforms for generating digital sequence recommendations. For example, digital recommendation systems can automatically analyze events (e.g., points of interest, objects, or actions) that are otherwise too numerous to explore and generate digital recommendations for sequentially performing selected events. For example, a digital recommendation system may generate a digital recommendation for particular points of interest for an individual visiting a new location and may further recommend the order for visiting the points of interest, providing the information necessary to make efficient use of available time.

Despite these advantages, conventional digital recommendation systems have several technological shortcomings that result in inaccurate, inflexible, and inefficient operation. For example, conventional digital recommendation systems often struggle to generate accurate digital recommendations. To illustrate, conventional digital recommendation systems often utilize a black-box approach that generates a digital recommendation without regard to dynamic, individual circumstances or preferences. Consequently, conventional systems often generate digital sequence recommendations to users who have no interest in pursuing one or more of the suggested events. Furthermore, this black-box approach also fails to convince users regarding accuracy of the generated recommendations, resulting in decreased utilization of such conventional systems.

In addition to accuracy concerns, conventional recommender systems are also inflexible. In particular, because conventional digital recommendation systems typically generate recommended event sequences utilizing a "black-box" approach, such systems generally recommend the same event sequences. In other words, conventional systems rigidly recommend a default event sequence even if a user is unsatisfied with the digital recommendation or even if different users have different preferences.

In addition to problems with accuracy and flexibility, conventional digital recommendation systems are also inefficient. Indeed, conventional systems often employ inefficient models to generate recommendations. For example, conventional systems often employ models that require a significant amount of time for training. This not only leads to slow operation of the systems, but it also requires a significant amount of computing resources (e.g., processing power). Further, in making model adjustments, conventional systems typically require retraining of these models, requiring further use of time and resources.

SUMMARY

One or more embodiments described herein provide benefits and/or solve one or more of the foregoing or other problems in the art with systems, methods, and non-transitory computer readable storage media that generate and modify digital recommended event sequences utilizing a dynamic user preference interface. For instance, the disclosed systems can provide a user interface with interactive elements for entry of user preferences. The disclosed systems can dynamically generate recommended event sequences by modifying a reward function of a recommendation model based on various user preferences identified via the interactive elements. By modifying a reward function and providing digital sequence recommendations in relation to different user preferences, the disclosed systems can provide controls and guidance to more accurately and flexibly personalize digital recommendation sequences. Moreover, the disclosed systems can provide interactive sequence recommendations that utilize digital visualizations to accurately and efficiently explain and justify the digital sequence recommendations.

For example, in one or more embodiments, the disclosed systems generate a recommended event sequence and provide the recommendation in a user interface displayed via a client device. In particular, the disclosed systems generate the recommended event sequence using a recommendation model that has been trained based on a plurality of historical event sequences. Additionally, the recommendation model includes a reward function that facilitates generation of recommendations. In one or more embodiments, the disclosed systems provide a plurality of interactive elements in the user interface that allow for entry of user preferences. Upon detecting input of one or more user preferences via the interactive elements, the system can modify the reward function of the recommendation model and generate a modified recommended event sequence. In one or more embodiments, the system further provides a visual representation of historical event sequences in the user interface. As a user enters user preferences, the system can modify the visual representation to display subsets of the plurality of historical event sequences corresponding to the preferences. In this manner, the disclosed systems can accurately, flexibly, and efficiently provide event sequence recommendations that are personalized to the user's preferences while informing the user of the justification for the recommendations.

The following description sets forth additional features and advantages of one or more embodiments of the disclosed systems, computer readable storage media, and methods. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
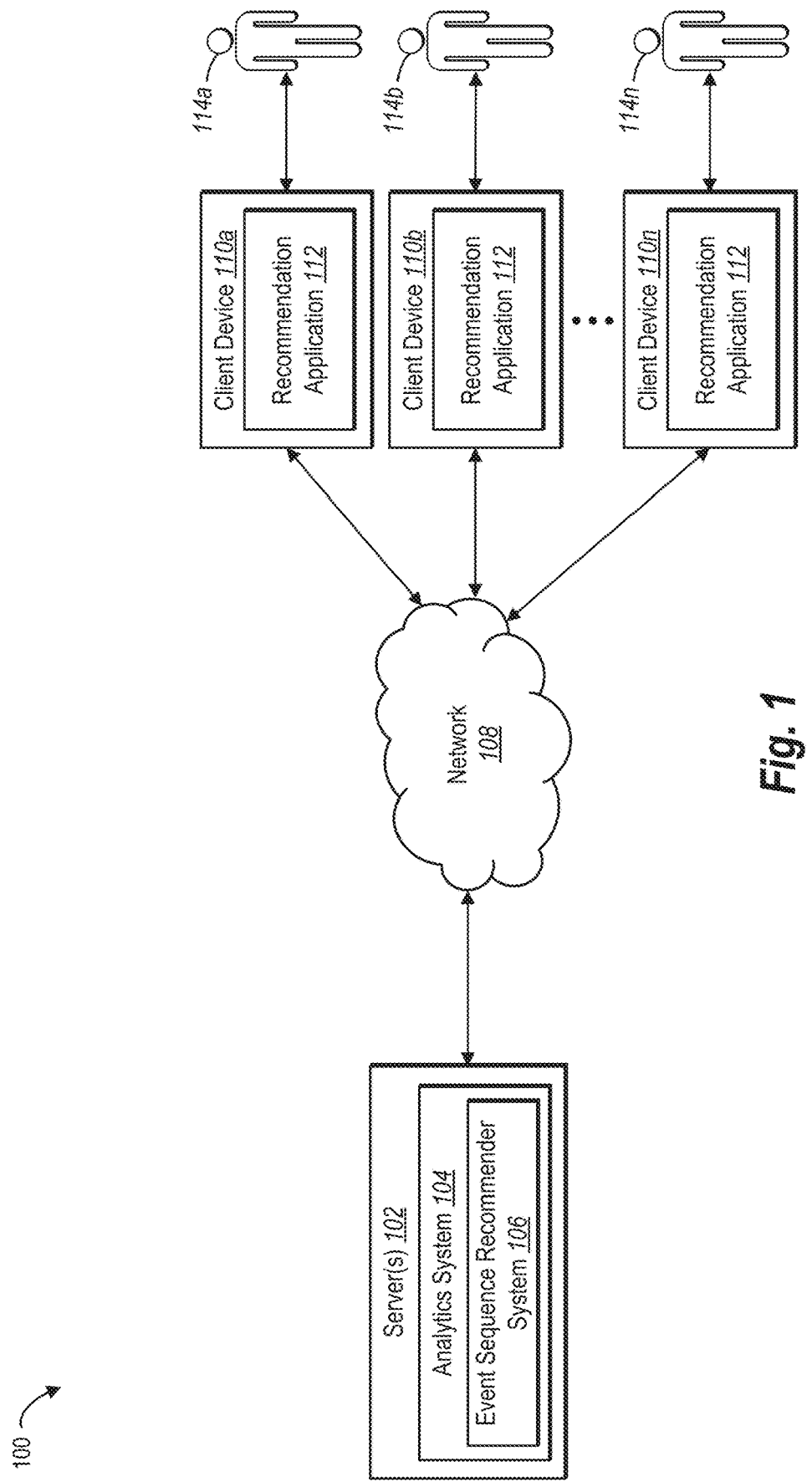
FIG. 1 illustrates an example environment in which an event recommender system can operate in accordance with one or more embodiments.

One or more embodiments described herein include an event sequence recommender system that generates and modifies digital recommendation event sequences utilizing a dynamic user preference interface. In particular, the event sequence recommender system can utilize machine learning to provide interactive sequence recommendations together with digital visualizations of user preferences and historical data utilized to generate the sequence recommendations. For example, the event sequence recommender system can generate a recommended event sequence using a recommendation model that includes a reward function. In one or more embodiments, the event sequence recommender system provides a user interface that displays both the generated recommendation and a plurality of interactive elements for entry of user preferences. The event sequence recommender system can dynamically detect different user preferences via the interactive elements, modify the reward function of the recommendation model, and provide a modified recommended event sequence with the interactive elements. Thus, the event sequence recommend system can provide accurate sequence recommendations with visualizations that explain the recommendation generation process while efficiently and flexibly personalizing recommended action plans.

To illustrate, in one or more embodiments, the event sequence recommender system generates a recommended event sequence by utilizing a recommendation model (with a reward function) trained based on a plurality of historical event sequences. The event sequence recommender system then provides, for display via a client device, a user interface that displays the recommended event sequence. The user interface further displays a plurality of interactive elements through which a user can enter user preferences. Upon detecting successive entries of user preferences via the interactive elements, the event sequence recommender system can iteratively modify the reward function of the recommendation model to generate modified recommended event sequences.

As just mentioned, the event sequence recommender system can generate recommended event sequences by utilizing a recommendation model trained based on a plurality of historic event sequences (i.e., sequences of events engaged in by previous users). The event sequence recommender system can utilize a variety of trained recommendation models. In one or more embodiments, the event sequence recommender system trains the recommendation model by using historical event sequences to build a probabilistic suffix tree. Using the probabilistic suffix tree, the event sequence recommender system can construct Markov Decision Process models and use the Markov Decision Process models in conjunction with Thompson sampling to determine an optimal recommended event sequence.

As discussed, in one or more embodiments, the recommendation model includes a reward function for generating recommendations. For instance, a reward function can indicate a frequency or desirability of one or more events (e.g., as determined by historical event sequences or some other source). The event sequence recommender system can utilize the reward function to determine the expected value of a recommendation. For example, the event sequence recommender system can perform Thompson sampling according to a reward function that reflects the value of events within an event sequence.

Further, as mentioned above, the event sequence recommender system can provide a plurality of interactive elements through which a user can input user preferences (e.g., particular events of interest). Upon detecting input of user preferences, the event sequence recommender system modifies the reward function of the recommendation model. In one or more embodiments, the event sequence recommender system modifies the reward function by providing a weighting factor to parameters of the reward function corresponding to the user preferences. For example, if a user inputs a preference indicating a desire to engage in a particular event, the event sequence recommender system can modify parameters of the reward function using a weighting factor to indicate that the event would provide a higher expected value for the user. The event sequence recommender system can then generate a modified recommended event sequence using the recommendation model and based on the modified reward function.

In one or more embodiments, the plurality of interactive elements includes a set of interactive elements for entry of user constraints (i.e., limitations on eligible event sequences). The event sequence recommender system can recommend an event sequence further based on the submitted user constraints. For example, where a user submits a limit to the number of events that can be included within an event sequence, the event sequence recommender system can recommend an event sequence that includes a number of events equal to or less than the limit.

As further mentioned above, the event sequence recommender system provides a user interface that displays the recommended event sequence via a client device. Additionally, the user interface can display the plurality of interactive elements for entry of user preferences. Where a user has entered user preferences and the event sequence recommender system accordingly generates a modified recommended event sequence, the user interface can display the modified recommended event sequence and the original (i.e., unmodified) recommended event sequence simultaneously.

In one or more embodiments, the user interface further includes a visual representation of historical event sequences. For example, the visual representation can display all of the historical event sequences upon which the recommended event sequences are based. In some embodiments, the visual representation displays only a subset of the historical event sequences. Moreover, where the event sequence recommender system generates a modified recommended event sequence due to entry of user preferences, the system can modify the visual representation to display one or more subsets of the historical event sequences corresponding to the user preferences. For example, where a user submits a preference to engage in a particular event, the event sequence recommender system can modify the visual representation to display only the subset of historical event sequences that include that event.

The event sequence recommender system provides several advantages over conventional systems. For example, the event sequence recommender system can improve the accuracy of implementing computer systems. In particular, the event sequence recommender system recommends event sequences that more accurately satisfy user preferences. To illustrate, by providing interactive elements that allow for dynamic, iterative entry of user preferences, the event sequence recommender system can determine the events that are most valuable to the user. By generating modified recommendations based on the submitted preferences, the event sequence recommender system can then accurately recommend valuable events to the user.

In addition, by providing interactive visualizations of user preferences together with recommended event sequences, the event sequence recommender system can increase user engagement and accuracy of resulting recommendations. Indeed, as outlined below, researchers have conducted experiments with regard to interactions by users with the event sequence recommender system. The results indicate that users are more likely to engage with implementations of the event sequence recommender system and refine the results to more accurately generate recommended event sequences that align to user preferences.

Further, the event sequence recommender system improves flexibility. In particular, by modifying the reward function of the recommendation model to then generate a modified recommended event sequence, the event sequence recommender system can flexibly adjust its recommendations based on the needs of a user. For example, upon detecting a user preference indicating that a user strongly desires to engage in a particular event, the event sequence recommender system can modify the recommended event sequence to include that event. In addition, the event sequence recommender system can flexibly apply to any variety of different events or event sequences. For example, the event sequence recommender system can generate recommended event sequences with regard to a sequence of points of interest for a user to visit, a sequence of digital content transmissions across client devices, or a sequence of other events.

The event sequence recommender system also improves the efficiency of implementing computing devices. For example, the event sequence recommender system can more efficiently provide recommendations in response to entry of user preferences. Specifically, by modifying the reward function in accordance with the user preferences, the event sequence recommender system can avoid retraining the recommendation model (and avoid a significant amount of time and processing power). Consequently, the event sequence recommendation system can use the previously trained recommendation model in conjunction with the modified reward function to quickly generate modified recommendations. The reduction in time and computing resources only increases as users repeatedly adjust user preferences before accepting a recommendation.

As illustrated by the foregoing discussion, the present disclosure utilizes a variety of terms to describe features and benefits of the image relighting system. Additional detail is now provided regarding the meaning of these terms. As used herein, the term "event" refers to an occurrence. In particular, an event can refer to the occurrence of an action performed by a user or computing device. For example, an event can include the occurrence of a user visiting a point of interest (e.g., a tourist attraction) or the occurrence of a computing device transmitting a digital communication (e.g., a transmission of digital content). As used herein, the term "event sequence" refers to a sequentially ordered combination of events. Similarly, as used herein, the term "historical event sequence" refers to a previous sequence of events (performed by one or more previous users or computing devices).

Additionally, as used herein, the term "user preference" refers to a user partiality (e.g., like or dislike), inclination, selection, or desire with respect to an event or an event sequence. In particular, a user preference includes a user desire to engage in or avoid a particular event, category of event, or other action or characteristic related to an event. A user preference can be represented using a binary value (e.g., a value indicating that the user either wants to engage in or avoid an event) or using a more granular scale (e.g., a number scale where a higher number indicates a stronger preference to engage in an event and a lower number indicates a stronger preference to avoid the event).

Further, as used herein, the term "user constraint" refers to a limitation. In particular, a user constraint includes a limitation, selected by a user, on an event sequence. For example, a user constraint can limit the number of events to be included within a recommended event sequence, a time required to complete the recommended event sequence, or the methods or resources used to complete the recommended event sequence.

Additionally, as used herein, the term "recommendation model" refers to a computer algorithm or model that generates event sequence recommendations. In particular, a recommendation model includes a computer algorithm that recommends a sequence of events based on the highest expected reward provided by the available event sequences as determined by historical data. For example, the recommendation model can include a machine learning model. As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network or deep learning), a decision tree (e.g., a gradient boosted decision tree), association rule learning, inductive logic programming, support vector learning, Bayesian network, regression-based model, principal component analysis, or a combination thereof.

Additional detail regarding the event sequence recommender system will now be provided with reference to the figures. For example, FIG. 1 illustrates a schematic diagram of an exemplary system environment ("environment") 100 in which an event sequence recommender system 106 can be implemented. As illustrated in FIG. 1, the environment 100 can include a server(s) 102, a network 108, client devices 110a-110n, and users 114a-114n.

Although FIG. 1 illustrates a particular number of client devices, it will be appreciated that the environment 100 can include any number of computing devices (fewer or greater than shown). Similarly, although FIG. 1 illustrates a particular arrangement of the server(s) 102, the network 108, the client devices 110a-110n, and the users 114a-114n, various additional arrangements are possible.

The server(s) 102, the network 108, and the client devices 110a-110n may be communicatively coupled with each other either directly or indirectly (e.g., through the network 108, discussed in greater detail below in relation to FIG. 11). Moreover, the server(s) 102 and the client devices 110a-110n may include any type of computing device (including one or more computing devices as discussed in greater detail below in relation to FIG. 11).

As mentioned above, the environment 100 includes the server(s) 102. The server(s) 102 can generate, store, receive, and/or transmit any type of data, including the plurality of historical event sequences and the user preferences. For example, the server(s) 102 can receive user preferences from the client device 110a. In one or more embodiments, the server(s) 102 comprises a data server. The server(s) 102 can also comprise a communication server or a web-hosting server.

As shown in FIG. 1, the server(s) 102 can include the analytics system 104. In particular, the analytics system 104 can collect analytics data. For example, the analytics system 104 can collect analytics data related to a user's history of engagement with one or more events, such as the events with which the user has engaged and the sequence of events engaged. The analytics system 104 can collect the analytics data in a variety of ways. For example, in one or more embodiments, the analytics system 104 causes the server(s) 102 and/or a third-party server to track user data (e.g., event sequence data) and report the tracked user data for storage on a database. In one or more embodiments, the analytics system 104 receives user data directly from the client devices 110a-110n via data stored thereon.

Additionally, the server(s) 102 can include the event sequence recommender system 106. In particular, in one or more embodiments, the event sequence recommender system 106 uses the server(s) 102 to generate modified recommended event sequences based on user preferences. For example, the event sequence recommender system 106 can use the server(s) 102 to receive one or more user preferences and then generate a modified recommended event sequence.

For example, in one or more embodiments, the server(s) 102 can receive a plurality of historical event sequences and train a recommendation model that includes a reward function based on the plurality of historical event sequences. The server(s) 102 can then provide, for display via a client device (e.g., one of the client devices 110a-110n) a user interface that includes the recommended event sequence as well as a visual representation of historical event sequences and a plurality of interactive elements that allow for entry of user preferences. Upon detecting submission of one or more user preferences via the interactive elements, the server(s) 102 can modify the reward function based on the preferences submitted and generate a modified recommended event sequence. The server(s) 102 can then provide the modified recommended event sequence for display via the client device and continue to provide the interactive elements for further submission of user preferences.

As illustrated by the previous example embodiments, the event sequence recommender system 106 can be implemented in whole, or in part, by the individual elements of the environment 100. Although FIG. 1 illustrates the event sequence recommender system 106 implemented with regards to the server(s) 102, it will be appreciated that components of the event sequence recommender system 106 can be implemented in any of the components of the environment 100.

In one or more embodiments, the client devices 110a-110n include computer devices that allow users of the devices (e.g., the users 114a-114n) to access and interact with digital content. For example, the client devices 110a-110n can include smartphones, tablets, desktop computers, laptop computers, or other electronic devices. The client devices 110a-110n can include one or more applications (e.g., the recommendation application 112) that allows users 114a-114n to access and interact with digital content. For example, the recommendation application 112 can include a software application installed on the client devices 110a-110n. Additionally, or alternatively, the recommendation application 112 can include a software application hosted on the server(s) 102, which may be accessed by the client devices 110a-110n through another application, such as a web browser.

Figure 2:
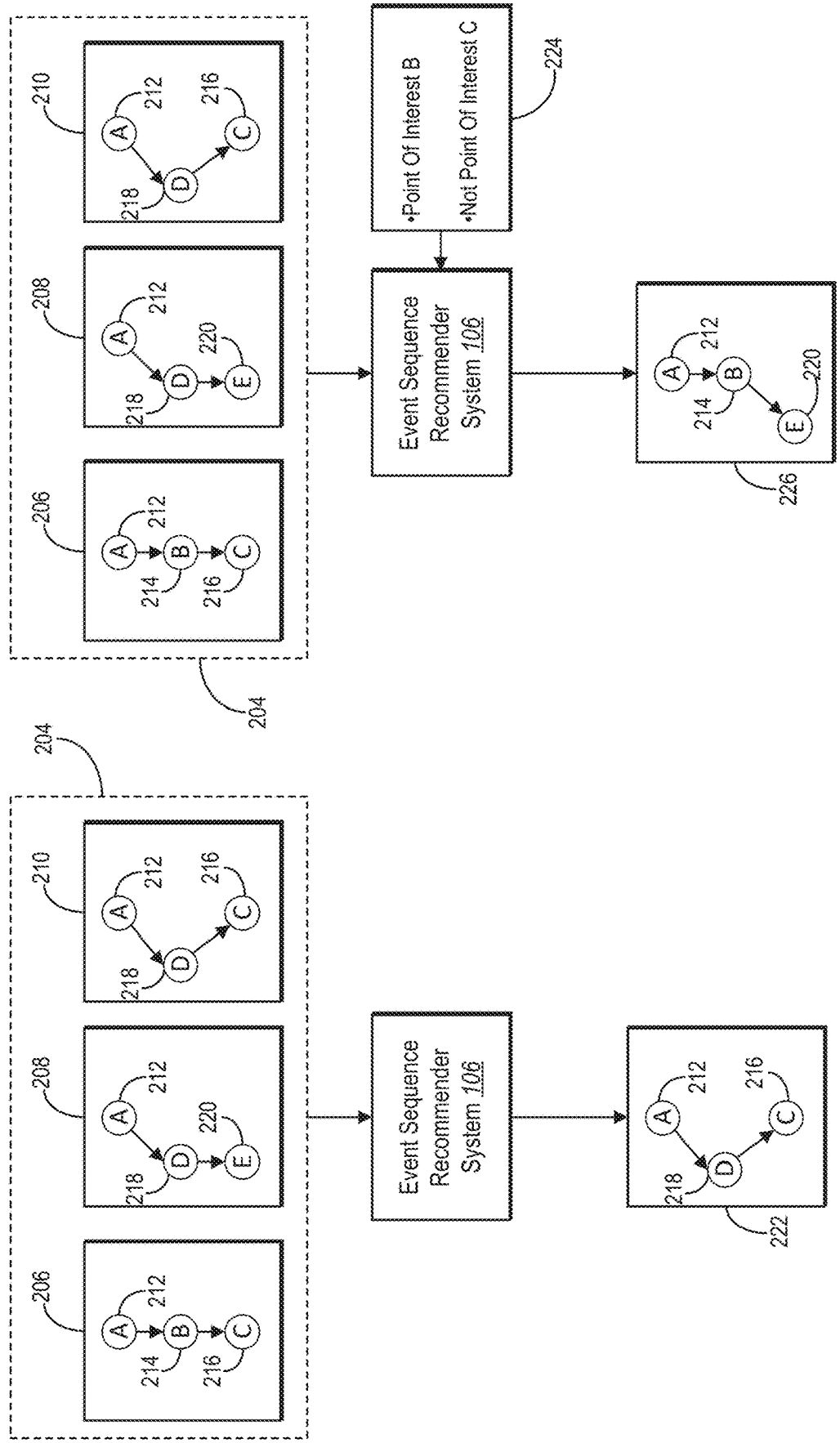
FIG. 2A illustrates the event sequence recommender system generating a recommended event sequence in accordance with one or more embodiments.
FIG. 2B illustrates the event sequence recommender system generating a modified recommended event sequence in accordance with one or more embodiments.

As just mentioned, the event sequence recommender system 106 can generate recommendations based on historical event sequences and user preferences. FIGS. 2A-2B illustrate block diagrams for generating event sequence recommendations in accordance with one or more embodiments. In particular, FIG. 2A shows a block diagram for generating a recommended event sequence based on a plurality of historical event sequences. Moreover, FIG. 2B illustrates a block diagram of generating a modified recommended event sequence based on both the plurality of historical event sequences and submitted user preferences.

As can be seen in FIG. 2A, the event sequence recommender system 106 uses a plurality of historical event sequences 204 to generate a recommended event sequence 222. In one or more embodiments, the event sequence recommender system 106 uses the plurality of historical event sequences 204 to train a recommendation model, which then generates the recommended event sequence 222 as will be discussed in more detail below with reference to FIGS. 3-4. For simplicity, FIG. 2A illustrates a plurality of historical event sequences including three historical event sequences; however, it should be noted that the event sequence recommender system 106 can use any number of historical event sequences.

As shown in FIG. 2A, the plurality of historical event sequences 204 includes a first historical event sequence 206, a second historical event sequence 208, and a third historical event sequence 210. Each of the historical event sequences 206-210 shown in FIG. 2A represents a sequence of points of interest (referred to here as "POIs") visited by a corresponding user while at a location. For example, the first historical event sequence 206 represents a sequence where the corresponding user visited POI_A 212 followed by POI_B 214 and then POI_C 216. Similarly, the second historical event sequence 208 represents a sequence where the corresponding user visited POI_A 212 followed by POI_D 218 and POI_E 220. And the third historical event sequence 210 represents a sequence where the corresponding user visited POI_A 212 followed by POI_D 218 and POI_C 216. In one or more embodiments, one or more of the plurality of historical event sequences 204 represents a sequence of more or less points of interest.

The event sequence recommender system 106 generates the recommended event sequence 222 based on the plurality of historical event sequences 204. For example, the recommended event sequence 222 shown in FIG. 2A recommends a sequence of several points of interest for a user to visit. As can be seen in FIG. 2A, the recommended event sequence 222 recommends for the user to visit POI_A 212 followed by POI_D 218 and then POI_C 216.

FIG. 2B illustrates the event sequence recommender system 106 using the plurality of historical event sequences 204 as well as user preferences 224 to generate a modified recommended event sequence 226. As shown in FIG. 2B, the user preferences 224 indicate that the user has submitted a preference for visiting POI_B 214 and a preference for avoiding POI_C 216. Accordingly, the event sequence recommender system 106 modifies the recommended event sequence 222 of FIG. 2A. The modified recommended event sequence 226 recommends for the user to visit POI_A 212 followed by POI_B 214 and POI_E 220. FIG. 2B shows that, by generating the modified recommended event sequence 226 based on the user preferences 224, the event sequence recommender system 106 provides a recommendation that is personalized for the user that submitted the user preferences 224. Therefore, by incorporating user preferences, the event sequence recommender system 106 provides recommendations that users are more likely to follow.

Figure 3:
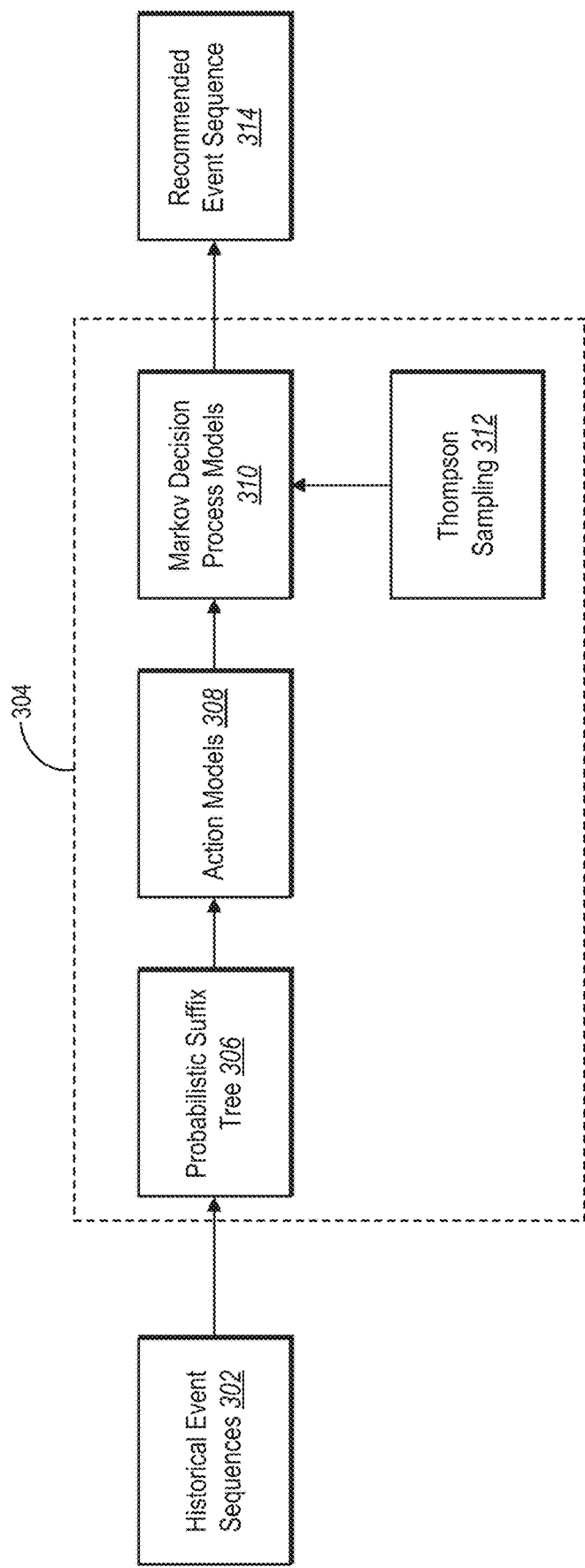
FIG. 3 illustrates a block diagram of training a recommendation model to generated recommended event sequences in accordance with one or more embodiments.

As mentioned above, the event sequence recommender system 106 uses a plurality of historical event sequences to generate recommended event sequences. In particular, the event sequence recommender system 106 generates recommended event sequences by utilizing a recommendation model trained based on the plurality of historical event sequences. FIG. 3 illustrates a block diagram of training the recommendation model in accordance with one or more embodiments. In one or more embodiments, the event sequence recommender system 106 trains the recommendation model in accordance with the methods disclosed in G. Theocharous, N. Vlassis, and Z. Wen, 2017 An Interactive Points of Interest Guidance System in *Proceedings of the International Conference on Intelligent User Interfaces Companion*, 49-52, which is incorporated herein by reference in its entirety and summarized below.

As can be seen in FIG. 3, the event sequence recommender system 106 uses the historical event sequences 302 to build the recommendation model 304. In particular, the event sequence recommender system 106 constructs a probabilistic suffix tree 306 based on the historical event sequences 302. The probabilistic suffix tree 306 includes a plurality of nodes, where each node represents a suffix (i.e., a sequential history of events leading up to that node). Accordingly, the suffix of each leaf node (i.e., final node) of the probabilistic suffix tree 306 represents a historical event sequence from the historical event sequences 302 taken by one or more previous users. In one or more embodiments, the event sequence recommender system 106 uses the probabilistic suffix tree 306 to represent every historical event sequence from the historical event sequences 302.

In addition to representing histories of events, each node is associated with a probability distribution that provides a probability of user engagement for each of the available events in light of the history of events with which the user has already engaged as represented by the suffix associated with that node. To illustrate, where four events are available for engagement and the suffix of a particular node represents that a user has already engaged in the first event followed by the second event, the probability distribution provides, in light of the user having already engaged in the first event followed by the second event, a first probability that the user will subsequently engage in the first event (again), a second probability that the user will subsequently engage in the second event (again), a third probability that the user will subsequently engage in the third event, and a fourth probability that the user will engage in the fourth event. The event sequence recommender system 106 determines these probabilities from the historical event sequences 302.

Thus, depending on what a user has already done, the event sequence recommender system 106 can use the probabilistic suffix tree 306 to predict what the user will do next. For example, based on the probabilistic suffix tree 306, the event sequence recommender system 106 can represent the probability that a user will engage in a subsequent event $s=s_{t+1}$ given the sequence of events with which the user has already engaged $X=(s_1, s_2 \ldots s_t)$ as $P(s|X)$ and can represent the probability of an entire sequence of events as $P(X)$. The event sequence recommender system 106 determines $P(X)$ as the product of the probability of each event in the sequence given the maximum suffix available in the tree (i.e., the leaf node representing the event sequence).

In one or more embodiments, the event sequence recommender system 106 constructs the probabilistic suffix tree 306 from the historical event sequences 302 using the pstree algorithm. In particular, the pstree algorithm can take multiple parameters (e.g., depth of the tree, the number of minimum occurrences of a suffix, and parametrized tree pruning methods) as input. To select the best set of parameters, the event sequence recommender system 106 uses the Modified Akaike Information Criterion (AICc) as follows:

$$AICc = 2k - 2\log(\mathcal{L}) + \frac{2k(k+1)}{n-k-1} \quad (1)$$

In the equation 1, $\log(\mathcal{L})$ represents the log likelihood of a set of sequences and is determined by the following where S represents all of the events appearing in the historical event sequences 302 and X maps the longest suffix available in the tree for each event:

$$\log(\mathcal{L}) = \Sigma_{s \in S} \log(P(s|X)) \quad (2)$$

After constructing the probabilistic suffix tree 306, the event sequence recommender system 106 constructs action models 308 for representing various personas (i.e., user types) based on the probabilistic suffix tree 306. In particular, the event sequence recommender system 106 constructs the action models 308 by parameterizing the probabilistic suffix tree 306 into multiple models where each model corresponds to a different persona. In one or more embodiments, the event sequence recommender system 106 creates the action models by perturbing the passive dynamics of the probabilistic suffix tree 306 so that each of the action models 308 increases the probability that a user having a persona corresponding to the action model listens to the resulting recommendation. In one or more embodiments, the event sequence recommender system 106 generates the action models 308 using the following equation where θ represents the user type and z is a normalizing factor:

$$P(s|X, a, \theta) = \begin{cases} P(s|X)^{1/\theta} & \text{if } a = s \\ P(s|X)/z & \text{otherwise} \end{cases} \quad (3)$$

-continued $$z = \frac{\sum_{s \neq a} P(s \mid X)}{1 - P(s = a \mid X)^{\frac{1}{\theta}}} \quad (4)$$

From the action models 308, the event sequence recommender system 106 constructs the Markov Decision Process models 310. The states/contexts of each of the Markov Decision Process models 310 correspond to the nodes of the probabilistic suffix tree 306. Using x to represent a suffix available in the probabilistic suffix tree 306, the event sequence recommender system 106 determines the probability of transitioning from every node to every other node by finding resulting longest suffixes in the tree for every additional event that an action can produce as provided by the action models 308. The probability of transitioning can be represented as P(x'|x, a, θ). The event sequence recommender system 106 further represents the reward of the Markov Decision Process models 310 using the following reward function where $x_n$ is the last event of the suffix x:

$$r(x) = r(x_n) \quad (5)$$

In some embodiments, a reward for a particular event indicates a frequency or desirability of that event as determined by the historical event sequences. In other embodiments, the reward is determined using a different dataset that provides the value of each event (e.g., a dataset that includes responses to survey questions that asked about the value of particular events). The event sequence recommender system 106 utilizes the reward function to compute the expected value of a recommendation. A higher reward indicates a higher expected value.

Using policy iteration, the event sequence recommender system 106 can determine the optimal policies and value function V*$_\theta$(x) corresponding to each of the Markov Decision Process models 310. In particular, a policy includes a function that specifies the action a user will take when in a particular state of the model.

After constructing the Markov Decision Process models 310, the event sequence recommender system 106 uses Thompson Sampling, which chooses actions in real time to maximize the expected experience as calculated by the reward on each state. In particular, through Thompson Sampling, the event sequence recommender system 106 recommends actions based on their probability of maximizing the expected reward as shown below:

$$\int \mathbb{1}[\mathbb{E}_{(r|X,a,\theta)} = \max_{a'} \mathbb{E}_{(r|X,a',\theta)}] P(\theta \mid \mathcal{D}) d\theta \quad (6)$$

In the equation above, X represents the current context and $\mathcal{D} = \{(X; a; r)\}$ represents past observations of contexts, actions, and rewards. The event sequence recommender system 106 implements Thompson Sampling by sampling, in each round, a parameter θ* from the posterior P(θ|$\mathcal{D}$), and choosing the action a* that maximizes $\mathbb{E}$ [r|X, a*, θ*] (i.e., the expected reward given the parameter, the action, and the current context). Algorithm 1 presented below describes the procedure in detail in accordance with one or more embodiments.

---
Algorithm 1

Input: Transition models: P(s|X, a, θ), P(x'|x, a, θ),
reward models: r(s), r(x), optimal value functions:
V$_\theta$*,
prior over θ: P(θ), horizon T.
a = arg max$_a$ (r(x) + γ Σ$_{x'}$ P(x'|x, a, θ)V$_\theta$*(x'))

---
Algorithm 1 for t = 1 : T do
   Sample parameter: θ = sample (P(θ))
   Play action: a
   Update the context: X = [X, s]
   Find longest suffix in the tree: x = suffix(X)
end for

---

As can be seen in Algorithm 1, in one or more embodiments, the event sequence recommender system 106 uses the recommendation model 304 to provide the entire recommended event sequence 314 to the user before the user has engaged in any events. For example, in one or more embodiments, the recommendation model 304 determines the first recommended action for the user (i.e., the first event of the recommended event sequence 314), assumes that the user will follow the recommendation, determines the second recommended action for the user (i.e., the second event of the recommended event sequence 314) based on that assumption, and continuously iterates through the process until the recommended event sequence 314 has been determined.

Figure 4:
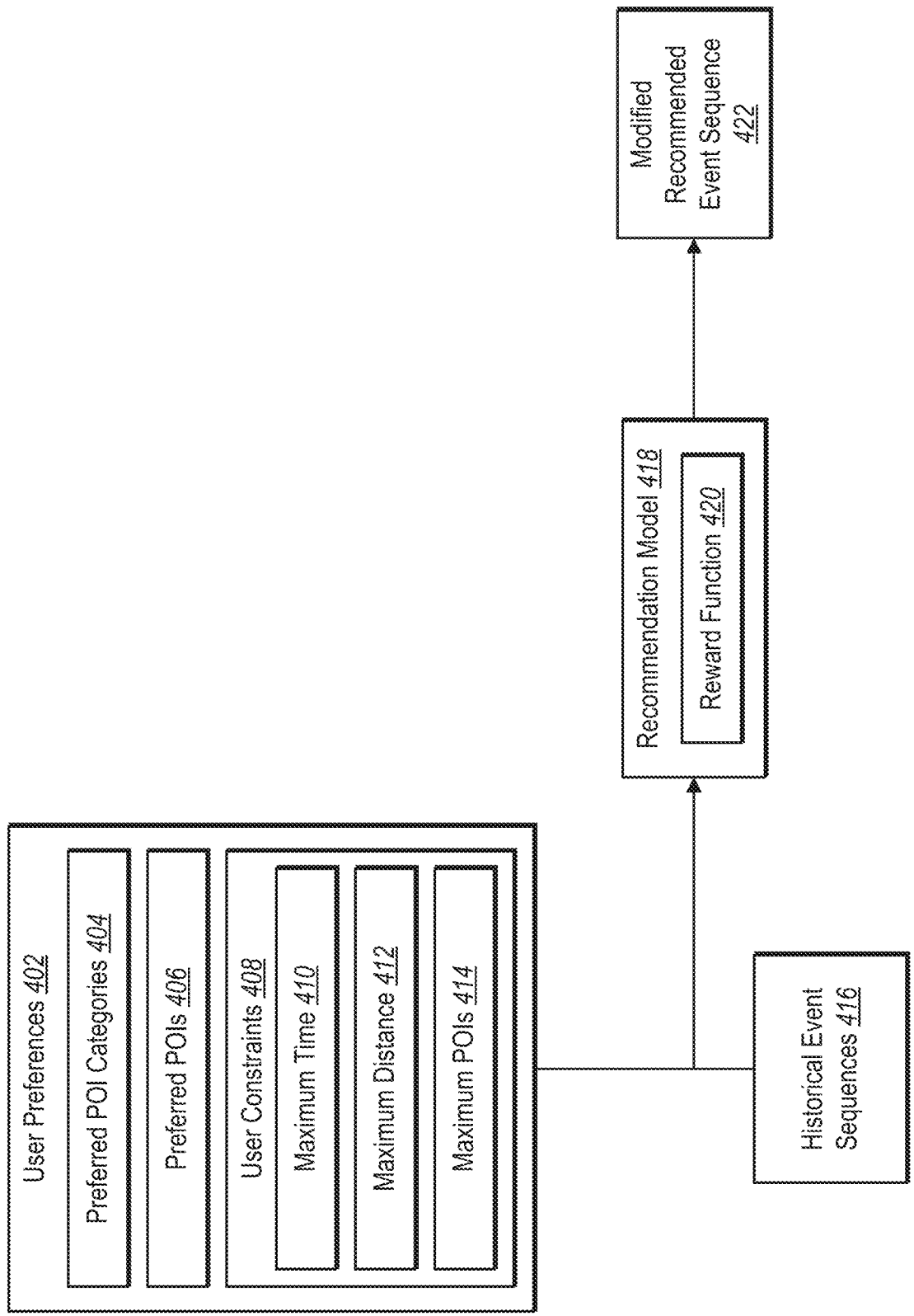
FIG. 4 illustrates using a trained recommendation model to generate a modified recommended event sequence based on user preferences in accordance with one or more embodiments.

Once the recommendation model has been trained, the event sequence recommender system 106 can accept user preferences and generate modified recommended event sequences. FIG. 4 provides a block diagram representing one or more embodiments in which the event sequence recommender system 106 uses the recommendation model to generate a modified recommended event sequence based on user preferences. In one or more embodiments, the recommendation model 418 shown in FIG. 4 is the same as the recommendation model 304 illustrated in FIG. 3.

As shown in FIG. 4, the event sequence recommender system 106 provides a set of user preferences 402 and the historical event sequences 416 to the recommendation model 418. In particular, the user preferences 402 include preferred POI categories 404, preferred POIs 406. The preferred POI categories 404 indicate one or more point of interest types that the submitting user prefers to visit or avoid. For example, the preferred POI categories 404 can indicate that the user prefers to visit or avoid public parks, museums, or places of entertainment. The preferred POIs 406 indicate one or more specific points of interest that the user prefers to visit or avoid. For example, the preferred POIs 406 can indicate that the user prefers to visit or avoid a specific public park (e.g., Central Park), a specific museum (e.g., the Metropolitan Museum), or a specific place of entertainment (e.g., Madison Square Garden).

In one or more embodiments, the preferred POI categories 404 or the preferred POIs 406 can indicate that one or more point of interest categories or particular points of interest, respectively, must be included in or excluded from the recommended event sequence. For example, the preferred POIs 406 can indicate that the resulting recommendation must include a visit to Central Park. Accordingly, the event sequence recommender system 106 will generate a recommendation that includes Central Park.

In providing the user preferences 402, the event sequence recommender system 106 modifies the reward function 420 of the recommendation model 418 in order to generate the modified recommended event sequence 422. In particular, the event sequence recommender system 106 modifies the reward function 420 without modifying the entire recommendation model 418, allowing the event sequence recommender system 106 to generate the modified recommended event sequence 422 without having to retrain the recommendation model 418. The event sequence recommender system 106 modifies the reward function 420 as presented by equation 5 by introducing a weighting factor w to represent the user's preferences as follows:

$$r(x) = w(x_n) \sqrt[\psi]{r(x_n)} \tag{7}$$

In one or more embodiments, the weighting factor w includes parameters associated with each of the points of interest available for the user to visit. For example, the weighting factor w includes a first parameter associated with a first point of interest and a second parameter associated with a second point of interest. The value of the weighting factor (i.e., the preference weight associated with each parameter) corresponds to the degree of preference indicated by the user and thereby affects the expected reward associated with having a user visit a particular point of interest and the likelihood that the point of interest will be included in the resulting event sequence. For example, if a user visiting New York City indicates a strong preference for visiting Central Park, the event sequence recommender system 106 modifies the reward function 420 by providing a corresponding preference weight to the parameter of the weighting function w associated with Central Park so that the resulting reward for having the user visit Central Park increases. Consequently, the event sequence recommender system 106 is more likely to include Central Park in the modified recommended event sequence 422.

In one or more embodiments, upon providing the preferred POI category 404, the event sequence recommender system 106 applies a corresponding preference weight to the parameters associated with each point of interest that falls under that category. For example, if a user visiting New York City indicates a strong preference for visiting public parks, the event sequence recommender system 106 modifies the reward function 420 by providing a corresponding preference weight to the parameters associated with each point of interest that is categorized as a public park (e.g., Central Park, Thomas Jefferson Park, Isham Park, etc.).

As shown in FIG. 4, the user preferences 402 further include the user constraints 408. In particular, the user constraints 408 include a maximum time 410, a maximum distance 412, and a maximum POIs 414. The maximum time 410 indicates a limit on the time required to visit the points of interest in the recommended event sequence. For example, the maximum time 410 can indicate that a recommended event sequence should require no more than three hours for the user to visit all of the included points of interest. The maximum distance 412 indicates a limit on the distance required for a user to travel in order to visit all of the points of interest in a recommended event sequence. For example, the maximum distance 412 can indicate that a recommended event sequence should require the user to travel no more than fifteen miles to visit all of the included points of interest. The maximum POIs 414 indicates a limit on the number of points of interest included within a recommended event sequence. For example, the maximum POIs 414 can indicate that the recommended event sequence should include no more than four points of interest.

In one or more embodiments, the event sequence recommender system 106 modifies the reward function 420 when providing some of the user preferences 402—such as the preferred POI category 404 and the preferred POI 406—but does not modify the reward function 420 when providing the user constraints 408. Rather, the event sequence recommender system 106 utilizes the user constraints 408 to filter out (i.e., avoid selecting) eligible event sequences when generating the modified recommended event sequence 422. For example, where the maximum time 410 indicates that a recommended event sequence should require no more than three hours for the user to visit all of the points of interest included within the event sequence, the event sequence recommender system 106 filters out all event sequences that would require the user to spend more than three hours visiting the included points of interest—even if those event sequences provide a higher total reward as provided by the reward function 420.

After generating the modified recommended event sequence 422, the event sequence recommender system 106 can receive further input of user preferences via the interactive elements, such as a modification of the user preferences 402. Subsequently, the event sequence recommender system 106 can further modify the reward function 420 of the recommendation model 418 (if appropriate) and generate another modified recommended event sequence based on the recommendation model and the modified reward function. Therefore, the algorithms and acts described in reference to FIGS. 3-4 can comprise the corresponding structure for performing a step for iteratively generating modified recommended event sequences by modifying the reward function of the recommendation model based on detecting user preferences via the plurality of interactive elements.

Figure 5A:
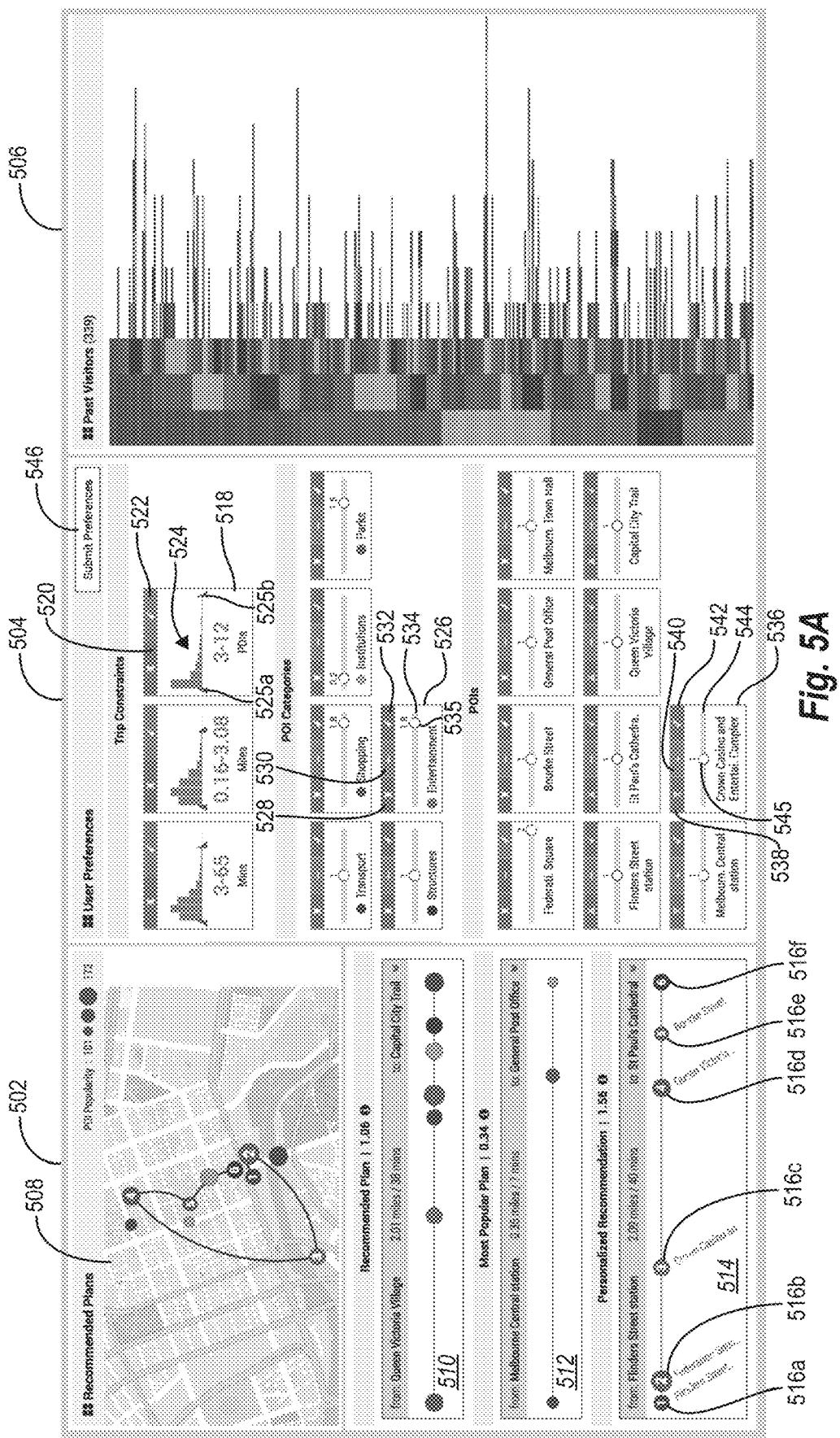
FIG. 5A illustrates a user interface displaying recommended event sequences and a historical event sequences in accordance with one or more embodiments.

Turning now to FIG. 5A, this figure illustrates a user interface 500 that the event sequence recommender system 106 provides for display via a client device in accordance with one or more embodiments. In particular, the user interface 500 displays recommended event sequences and interactive elements for identifying and illustrating user preferences utilized to generate recommended event sequences. More specifically, as illustrated in FIG. 5A, the user interface 500 includes a recommendation view 502, a user preferences view 504, and a historical event sequences view 506.

In some embodiments, the user interface 500 provides only the recommendation view 502 initially (i.e., when the event sequence recommender system 106 initially provides the user interface 500—such as when the application running the event sequence recommender system 106 activates) but provides an option to expand the user interface 500 to further display the user preferences view 504 and the historical event sequences view 506. In further embodiments, the user interface 500 always displays the views 502-506 at all times.

As illustrated in FIG. 5A, the recommendation view 502 includes a map display 508, a general recommendation 510, a most popular sequence 512, and a personalized recommendation 514. In particular, the map display 508 displays the event sequence corresponding to one of the general recommendation 510, the most popular sequence 512, or the personalized recommendation 514. More specifically, the map displays the points of interest included in the event sequence and the recommended trajectory for visiting the points of interest superimposed over a map of the location to which the user is visiting. For example, if the event sequence provided points of interest to visit within New York City, the map display 508 would superimpose the event sequence over a map of the area of New York City containing the points of interest. In one or more embodiments, the user interface 500 can change which event sequence is displayed in the map display 508 in response to detecting a user selection of one of the general recommendation 510, the most popular sequence 512, or the personalized recommendation 514.

The general recommendation 510 provides a recommended event sequence based on a plurality of historical event sequences. In particular, the general recommendation 510 provides a recommended event sequence generated by the event sequence recommender system 106 before a user has submitted user preferences (e.g., the recommended event sequence 314 of FIG. 3). Because the recommended event sequence can be based only on the plurality of historical event sequences, the general recommendation 510 can be the same event sequence for all users.

The most popular sequence 512 provides the most popular event sequence as determined by the plurality of historical event sequences. In particular, the most popular sequence 512 provides the event sequence that was most frequently used by prior visitors to the location (e.g., regardless of the expected reward of that event sequence). Because the most frequently used event sequence is independent of any user preferences, the most popular sequence 512 can be the same event sequence for all users.

The personalized recommendation 514 provides a modified recommended event sequence generated based on the plurality of historical event sequences and one or more submitted user preferences. In particular, the personalized recommendation 514 provides a modified recommended event sequence (e.g., the modified recommended event sequence 422 of FIG. 4) generated by the event sequence recommender system 106 after a user has submitted one or more user preferences via the user preferences view 504. In other words, the personalized recommendation 514 provides an event sequence tailored to the needs and/or desires of a particular user.

As illustrated in FIG. 5A, the map display 508 and each of the views 510-514 display the events within the event sequences with visual indicators, such as the visual indicators 516a-516f corresponding to the points of interest provided in the personalized recommendation 514. In particular, FIG. 5A illustrates that the visual indicators 516a-516f can vary in size and color. In one or more embodiments, the size of a visual indicator encodes the popularity of the corresponding event. For example, the visual indicator 516b is larger than the visual indicator 516a, indicating that the point of interest corresponding to the visual indicator 516b is more popular (i.e., more frequently visited by prior users) than the point of interest corresponding to the visual indicator 516a. Additionally, as shown in FIG. 5A, the color of the visual indicator encodes the event category that corresponds to the visual indicator. For example, the color of the visual indicator 516a shows that the corresponding points of interest is a place of transportation while the color of the visual indicator 516b shows that the corresponding point of interest is a park.

As shown in FIG. 5A, the user preferences view 504 includes a plurality of interactive elements for entry of user preferences. For example, the user preferences view 504 includes the user constraint element 518 for input of a user constraint, the POI category preference element 526 for input of a preferred point of interest category, and the POI preference element 536 for input of a preferred point of interest. Each of the interactive elements include one or more components that facilitate input of user preferences. The user preferences view 504 further includes a submission button 546 that enables a user to submit user preferences after engaging with the interactive elements to adjust the desired preferences.

As illustrated in FIG. 5A, the user constraint element 518 includes an exclusion option 520, an inclusion option 522, a bar chart 524 and constraint indicators 525a-525b. In particular, when a user selects the exclusion option 520, the event sequence recommender system 106 ignores the corresponding user constraint when generating the modified recommended event sequence. When the user selects the inclusion option 522, on the other hand, the event sequence recommender system 106 generates the modified recommended event sequence based, at least partly, on the corresponding user constraint. Moreover, bar charts (e.g., the bar chart 524) provide additional information to the user regarding characteristics of the historical event sequences in relation to the constraints. As shown in FIG. 5A, bar charts can provide detail regarding the frequency (e.g., the number of historical event sequences) that satisfy a particular duration, distance, or number of points of interest reflected by the historical event sequences. For example, the bar chart 524 indicates that the majority of previous users represented by the historical event sequences only traveled to three points of interest during their visit (i.e., the majority of historical event sequences only include three different points of interest). The bar charts provide live feedback to a user regarding the number of historical event sequences (previous users) that satisfy particular selected constraints.

The constraint indicators 525a-525b allow a user to adjust the constraint that will be submitted to the event sequence recommender system 106. In particular, the positioning of the constraint indicators 525a-525b provides the constraint range. For example, the current positioning of the constraint indicators 525a-525b shown in FIG. 5A indicates that the current constraint range allows the event sequence recommender system 106 to generate a modified recommended event sequence having any number of points of interest between three and twelve, inclusive. A user can adjust the position of either or both of the constraint indicators 525a-525b to modify the constraint range.

As shown in FIG. 5A, the POI category preference element 526 includes an exclusion option 528, a preference select option 530, an inclusion option 532, and a slide bar 534. In particular, when a user selects the exclusion option 528, the event sequence recommender system 106 ignores the corresponding user preference. In particular, the event sequence recommender system 106 does not apply a preference weight to the parameter of the weighting function corresponding to the particular user preference.

When a user selects the preference select option 530, the user can then interact with the slide bar 534 to adjust the user preference. As shown in FIG. 5A, the positioning of the marker 535 along the slide bar 534 corresponds to a numerical value indicating the user's desire to visit or avoid points of interest falling under the corresponding point of interest category. For example, in one or more embodiments, a numerical value greater than one indicates that the user prefers to visit points of interest from the corresponding point of interest category while a numerical value less than one indicates that the user would prefer to avoid such points of interest. In one or more embodiments, the event sequence recommender system 106 uses this numerical value directly as the preference weight applied to the parameter of the weighting function corresponding to the particular user preference (i.e., applied to the parameters associated with each of the points of interest from the point of interest category). In some embodiments, the event sequence recommender system 106 converts the numerical value to a corresponding preference weight.

The inclusion option 532 enables the user to indicate that one or more points of interest from the corresponding point of interest category must be included within the modified recommended event sequence. In one or more embodiments, when a user selects the inclusion option, the event sequence recommender system 106 maximizes the preference weight applied to the parameter of the weighting function that corresponds to the particular user preference. Consequently, an event sequence that includes one or more points of interest from the corresponding point of interest category is likely to be the event sequence having the highest associated reward and, therefore, likely to be selected as the modified recommended event sequence. In some embodiments, selection of the inclusion option 532 operates as an additional constraint. In particular, when generating the modified recommended event sequence, the event sequence recommender system 106 filters out any event sequence that does not include one or more points of interest from the corresponding point of interest category even if those event sequences provide the highest overall reward.

Further, as shown in FIG. 5A, the POI preference element 536 includes an exclusion option 538, a preference select option 540, an inclusion option 542, and a slide bar 544. In one or more embodiments, the POI preference element 536 operates in the same manner as the POI category preference element 526. In particular, the exclusion option 538 indicates that the corresponding point of interest preference is to be ignored, the preference select option 540 allows the user to position a marker 545 along the slide bar 544 to indicate the preference, and the inclusion option 542 can maximize the preference weight applied to the parameter of the weighting function that corresponds to the particular user preference (and/or operate as an additional constraint).

The historical event sequences view 506 provides users with context regarding the recommended event sequences and the modified recommended event sequences. As illustrated in FIG. 5A, the historical event sequences view 506 displays a visual representation of historical event sequences from the plurality of historical event sequences upon which the recommendations are based. In one or more embodiments, the historical event sequences view 506 displays all of the plurality of historical event sequences. In some embodiments, the historical event sequences view 506 displays only a subset of the plurality of historical event sequences.

For example, the plurality of historical event sequences may be too numerous to display within a single frame within an understandable and/or visually appealing manner. Accordingly, the event sequences view 506 can display a number of historical event sequences sufficient to provide the user with useful context. In one or more embodiments, the event sequence recommender system 106 selects the subset to display by selecting a representative sample of the plurality of historical event sequences. More detail will be provided regarding display of historical event sequences below with reference to FIG. 5B.

In one or more embodiments, the historical event sequences view 506 further includes tools (not shown) enabling a user to interact with the display of historical event sequences. For example, the historical event sequences view 506 can include a zoom tool allowing a user to zoom into or out of the displayed historical event sequences. Additionally, the historical event sequences view 506 can include a dragging tool allowing a user to drag or scroll through the current display of historical event sequences to view historical event sequences or portions of historical event sequences that are included within the historical event sequences view 506 but not currently displayed within the frame. Further, the historical event sequences view 506 can include a highlighting tool, allowing a user to highlight one or more of the displayed historical event sequences or portions of historical event sequences.

In one or more embodiments, the event sequence recommender system 106 changes the user interface 500 depending on the user preferences input by the user. For example, in one or more embodiments, when the events sequence recommender system 106 initially displays the user interface 500 (e.g., before the user has input any user preferences), the recommendation view 502 displays the map display 508, the general recommendation 510, and the most popular sequence 512 without displaying the personalized recommendation 514. After the user inputs one or more user preferences using the user preferences 504 view, the recommendation view 502 changes to include the personalized recommendation 514. In some embodiments, the map display 508 itself changes to display the modified recommended sequence represented by the personalized recommendation 514. As the user iteratively submits modified user preferences, the event sequence recommender system 106 updates the modified recommended event sequence, and the personalized recommendation 514 (and the map display 508) iteratively changes to provide the updated modified recommended event sequence.

Additionally, in one or more embodiments, the event sequence recommender system 106 changes the historical event sequences view 506 to reflect user preferences. For example, in one or more embodiments, the historical event sequences view 506 displays a visual representation of the plurality of historical event sequences or a subset of the plurality of historical event sequences (e.g., a subset containing a representative sample) before the user has submitted any user preferences. After the user inputs one or more user preferences, the event sequence recommender system 106 changes the visual representation provided by the historical event sequences view 506 to display a subset of the plurality of historical event sequences corresponding to the user preferences. For example, if a user submits a user constraint requiring that the modified recommended event sequence has no more than three points of interest, the event sequence recommender system 106 changes the visual representation to display the subset of historical event sequences that include no more than three points of interest.

It should be noted that in one or more embodiments, because the recommendation model has already been trained, it still generates the modified recommended event sequences based on all of the plurality of historical event sequences (as well as the submitted user preferences); however, its display of the subset corresponding to the submitted preferences provides the user with the most relevant historical event sequences. As the user iteratively submits modified user preferences, the visual representation iteratively changes to display subsets of the plurality of historical events sequences corresponding to the user preferences.

Figure 5B:
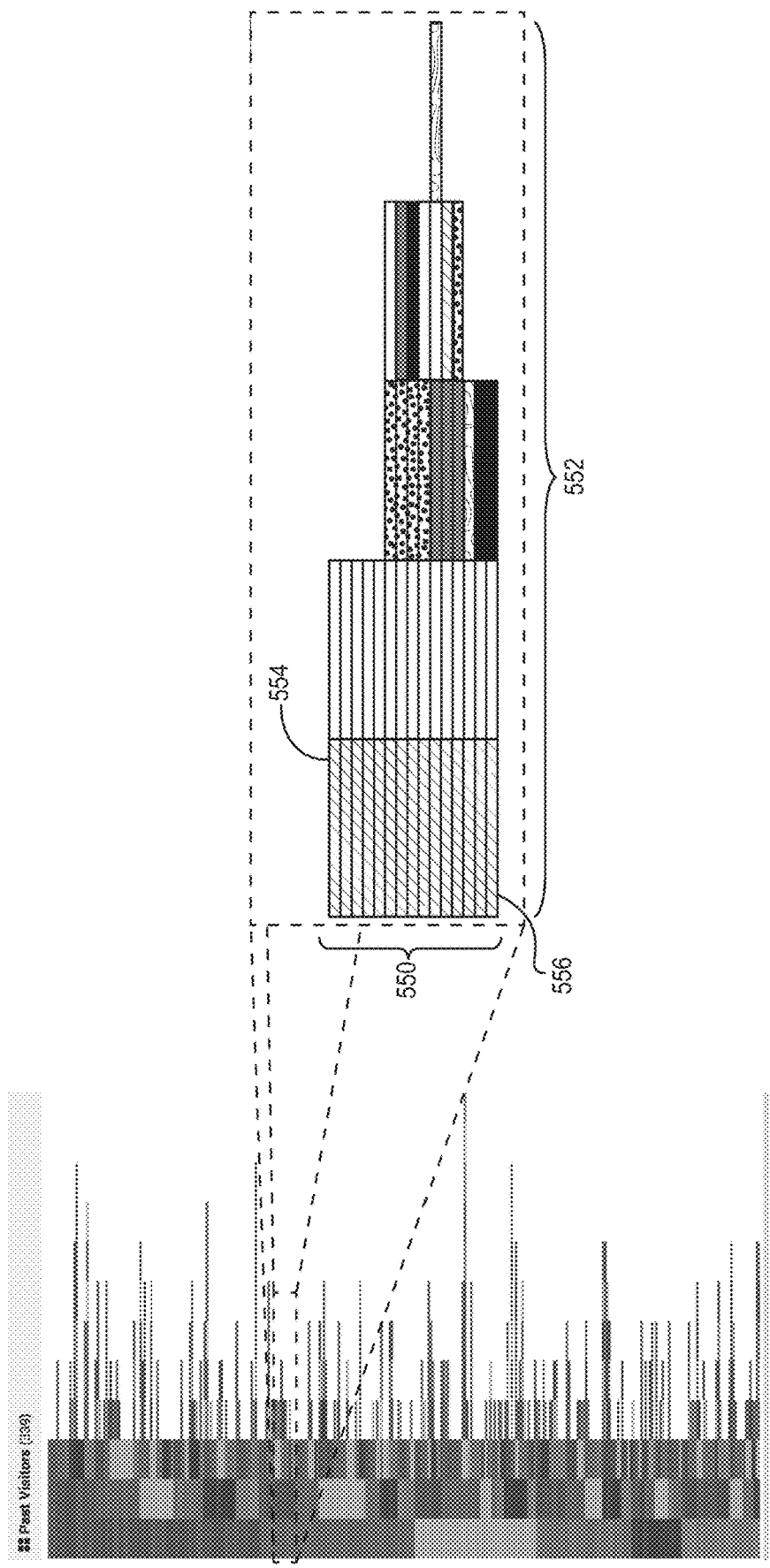
FIG. 5B illustrates a close of up view of a portion of the historical event sequences displayed in the user interface of FIG. 5A in accordance with one or more embodiments.

FIG. 5B illustrates an enlarged view of a portion of the visual representation of historical event sequences provided by the historical event sequences view 506 of FIG. 5A. As shown in FIG. 5B, the visual representation includes a plurality of rows 550 and a plurality of columns 552. In particular, each row from the plurality of rows 550 represents a historical event sequence. Each column from the plurality of columns 552 represents an event (e.g., a point of interest) within the historical event sequence (or, more specifically, the event with which the user was engaged during a particular time step). In one or more embodiments, each column reflects a predetermined length of the time; however, in some embodiments, the length of the time step is adjustable by the user.

Further, as shown in FIG. 5B, each rectangle within a particular historical event sequence is associated with a color. In one or more embodiments, the color represents the category of the point of interest corresponding to the rectangle. For example, a rectangle having a first color can represent that the corresponding point of interest was a public park. In some embodiments, the color represents a specific point of interest (e.g., the first color represents that the corresponding point of interest was Central Park). Considering the color and number of columns spanned, the rectangles of a historical event sequence indicate (approximately) where the previous user visited, in what sequence, and/or how long the previous user visited each point of interest. For example, the row 554 includes two rectangles with each rectangle spanning one column. Therefore, the previous user corresponding to the historical event sequence represented by the row 554 visited two points of interest and remained at each point of interest for approximately one time step. As an additional example, the row 556 includes three rectangles with each rectangle spanning one column. Therefore, the previous user corresponding to the historical event sequence represented by the row 556 visited three points of interest and remained at each point of interest for approximately one time step.

In one or more embodiments, the event sequence recommender system 106 organizes the plurality of rows 550 by grouping similar historical event sequences together. For example, as shown in FIG. 5B, the event sequence recommender system 106 can group all historical event sequences that start at a first point of interest, allowing a user to see how the previous users that started at that point of interest progressed through a sequence of events (e.g., which subsequent points of interest the previous users visited, how long the previous users remained at each point of interest, etc.). To illustrate, the historical event sequences represented by the plurality of rows 550 can include historical event sequences where the corresponding previous users first visited the Empire State Building, enabling a user to see where the previous users visited after visiting the Empire State Building. The event sequence recommender system 106 can additionally organize each group of historical event sequences into subgroups so that each historical event sequence in the subgroup includes the same second point of interest (and further, the same third point of interest, the same fourth point of interest, etc.)

Providing the user interface 500 of FIG. 5A and modifying the different views included therein, the event sequence recommender system 106 more efficiently engages users by providing more informative and interactive experiences. As discussed above, researchers conducted a study to determine effectiveness of one or more embodiments of the event sequence recommender system 106. FIGS. 6A-8 illustrate graphs reflecting results of the study. In particular, the graphs of FIGS. 6A-8 compare the performance, as provided by the user feedback, of the event sequence reminder system (e.g., implementations of the user interface 500, referred to as "ESRM" and a more simplified, conventional "black-box" user interface (referred to as "conventional").

The user feedback was gathered through a study, which asked questions to twelve participants who were visiting Melbourne, Australia for the first time. All of the participants were male university students, ten of whom were between the ages of 25 and 34, one of whom was between the ages of 18 and 24, and one of whom was between the ages of 35 and 44. None of the participants had previous experience engaging with the event sequence recommender system 106. The study was conducted on a lap-top computer.

The historical event sequences used to build the recommendation model of the event sequence recommender system 106 extracted from the YFCC100M dataset disclosed in B. Thomee, D. A. Shamma, G. Friedland, B. Elizalde, K. Ni, D. Poland, D. Borth, and L. Li, 2016. YFCC100M: The new data in multimedia research. *Commun. ACM* 59, 2 (2016), 64-73. In particular, the YFCC100M dataset contains photos and videos, including meta information such as the time and location of the media. The location sequences were extracted from the dataset, which was then narrowed to the ten most popular points of interest. After preprocessing and removing loops, the resulting dataset included 1,399 historical event sequences and ten points of interest. Each historical event sequence included an average of five points of interest.

Figure 6A:
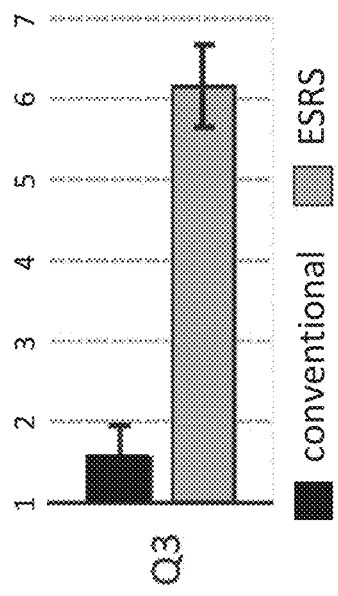
FIGS. 6A-6C illustrate multiple graphs reflecting experimental results regarding the operation of the event sequence recommender system in accordance with one or more embodiments.
Figure 6C:
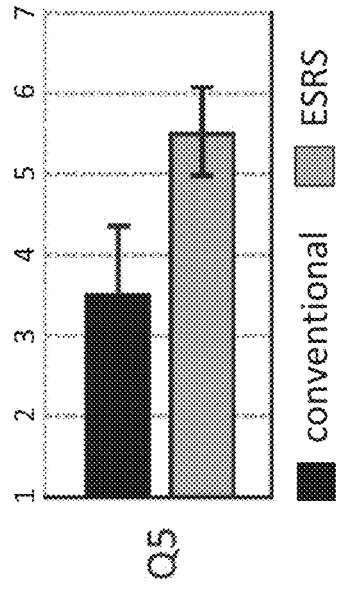
Figure 6B:
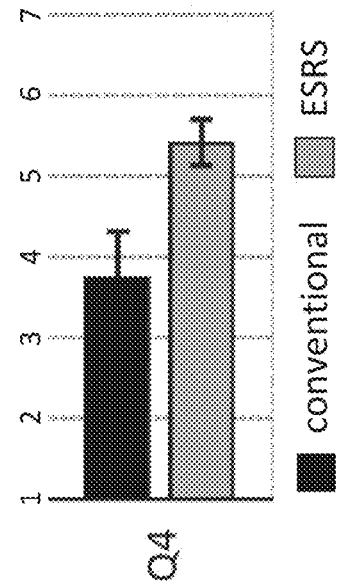
Figure 8:
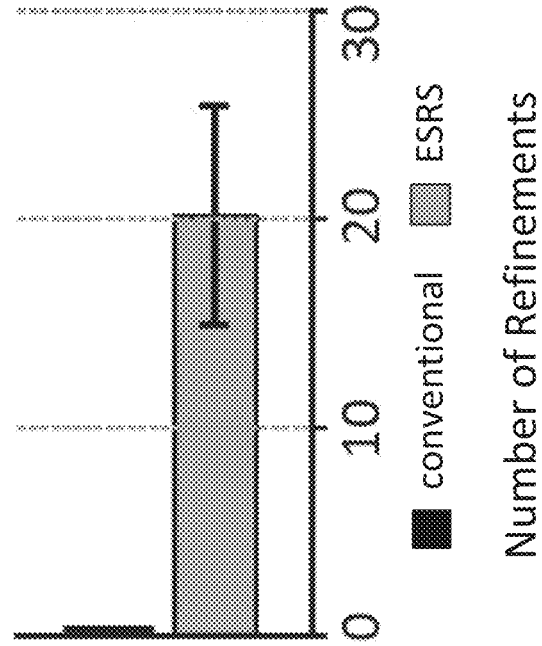
FIGS. 7-8 illustrate multiple graphs reflecting experimental results regarding time and user engagement in relation to operation of the event sequence recommender system in accordance with one or more embodiments.
Figure 7:
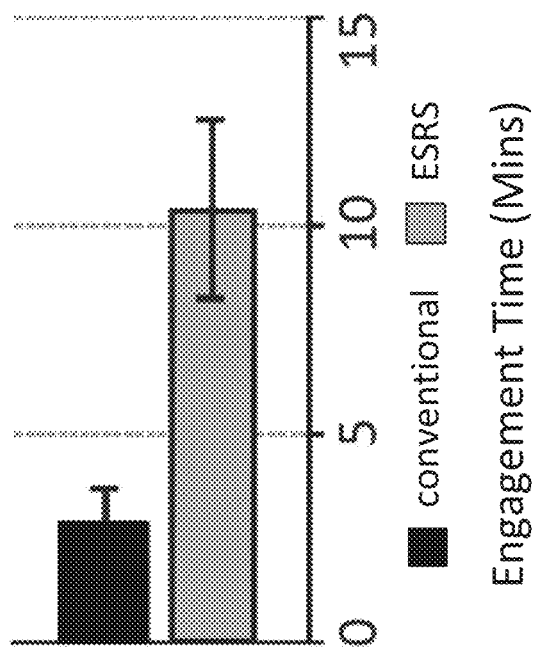

Each participant session lasted about sixty minutes, which included five minutes for general training and the study task overview, which provided instruction to the participant. Each participant was shown a brief tutorial covering the components and operations of each interface. Each participant then planned a trip using each interface and, when satisfied with the recommendation, clicked a "finish" button. Subsequently, each participant then completed a questionnaire using a seven-point Likert scale. FIGS. 6A-6C illustrate graphs providing the feedback collected from the questionnaires. FIGS. 7-8 illustrate graphs providing passive feedback (i.e., completion time and number of refinements, respectively). In particular, the study used the Wilcoxon test to compare questionnaire ratings and T-tests for the passive feedback, with a significance level of 0.01

FIG. 6A provides a graph reflecting feedback to a question asking, "Do you agree that the interface informed you about how the recommendations were made?" As seen from the graph, the ESRS interface (receiving an average score of 6.17) was rated as more informative than the conventional user interface (receiving an average score of 1.58). FIG. 6B provides a graph reflecting feedback to a question asking, "How confident are you that you will follow the recommended plan in your trip?" The graph shows that the participants were generally more confident that they would follow the recommendation provided by the ESRS user interface (receiving an average score of 5.42) than they were for the recommendation provided by the conventional user interface (receiving an average score of 3.75). The graph of FIG. 6C reflects feedback to the question asking, "How confident are you that the recommended plan will provide a good experience?" The graph shows that the participants were generally more confident that the recommendation provided by the ESRS user interface (receiving an average score of 5.50) would provide a good experience than they were for recommendation provided by the conventional user interface (receiving an average score of 3.50).

FIG. 7 illustrates a graph providing the average engagement time the participants took in planning their trip using each user interface. In particular, the graph shows that the participants spent an average time of 2.80 minutes (with a standard deviation of 1.61 minutes) engaging with the conventional user interface to plan their trip. By contrast, the graph shows that the participants spent an average of 10.38 minutes (with a standard deviation of 3.86 minutes) engaging with the ESRS user interface. As discussed above, this increased engagement increases the confidence and likelihood that users will utilize recommendations from the event sequence recommender system 106.

FIG. 8 illustrates the average number of refinements the participants made while using each user interface. The graph shows that the participants made no results refinements when using the conventional user interface. This corresponds to the lack of user interaction provided by the conventional user interface. By contrast, the graph further shows that the participants made an average of 20 result refinements (with a standard deviation of 9.22 refinements) when using the ESRS user interface, showing that the participants found that the ability provided by the event sequence recommender system 106 to submit user preferences was beneficial, leading to increased engagement, confidence, and accuracy of results.

Although many of the foregoing examples discuss event sequences in relation to physical points of interest, the event sequence recommender system 106 can also generate other recommended event sequences. As mentioned above, in one or more embodiments, the event sequence recommender system 106 recommends a sequence of digital content transmissions across client devices. For example, an event can include the occurrence of a transmission of digital content to one or more client devices and the event sequence recommender system 106 can utilize a trained recommendation model to generate a recommended sequence of digital content transmissions. In particular, the event sequence recommender system 106 can train the recommendation model based on a plurality of historical event sequences where each historical event sequence includes a sequence of digital content transmissions carried out by one or more previous users.

Subsequently, the event sequence recommender system 106 can provide, for display via a client device, a user interface that displays the recommended sequence of digital content transmissions, the plurality of historical digital content transmissions, and a plurality of interactive elements for entry of user preferences. In one or more embodiments, a user preference can include a distribution channel through which to transmit the digital content (e.g., email, multimedia messaging, social media post, etc.), a preferred digital content category (e.g., video advertisement, digital image, informative literature etc.), or a preferred digital content item to transmit (e.g., a particular advertisement or piece of informative literature). In some embodiments, the plurality of interactive elements can include interactive elements for entry of user constraints. In particular, a user constraint can include a constraint on the number of digital content transmissions (or a period of time over which digital content transmissions will occur).

The event sequence recommender system 106 can modify the reward function of the recommendation model based on the input of the user preferences. As mentioned above, the event sequence recommender system 106 can utilize the reward function to determine the expected value of a recommendation. In particular, the reward function can indicate the likelihood of a recommendation producing a reward. For example, in embodiments in which an event includes the occurrence of a digital content transmission, a reward can include an action taken by a recipient of the digital content transmission (e.g., a conversion, a click, or a view) or the amount of revenue obtained as a result of the digital content transmission.

After modifying the reward function, the event sequence recommender system 106 can generate a modified recommended event sequence of digital content transmissions based on the recommendation model and the modified reward function. Subsequently, the event sequence recommender system 106 can provide the modified recommended sequence for display via the client device along with the plurality of interactive elements for further entry of user preferences. Further, upon generating the modified recommended event sequence of digital content transmissions, the event sequence recommender system 106 can modify the visual representation of historical event sequences to display those historical event sequences corresponding to the selected user preferences.

Furthermore, the event sequence recommender system 106 can also execute digital content transmissions (e.g., execute a digital content campaign) in accordance with a recommended event sequence. For example, upon providing a recommended event sequence for display, the event sequence recommender system 106 can distribute digital content across a computer network to one or more client devices as outlined in the recommended event sequence.

Figure 9:
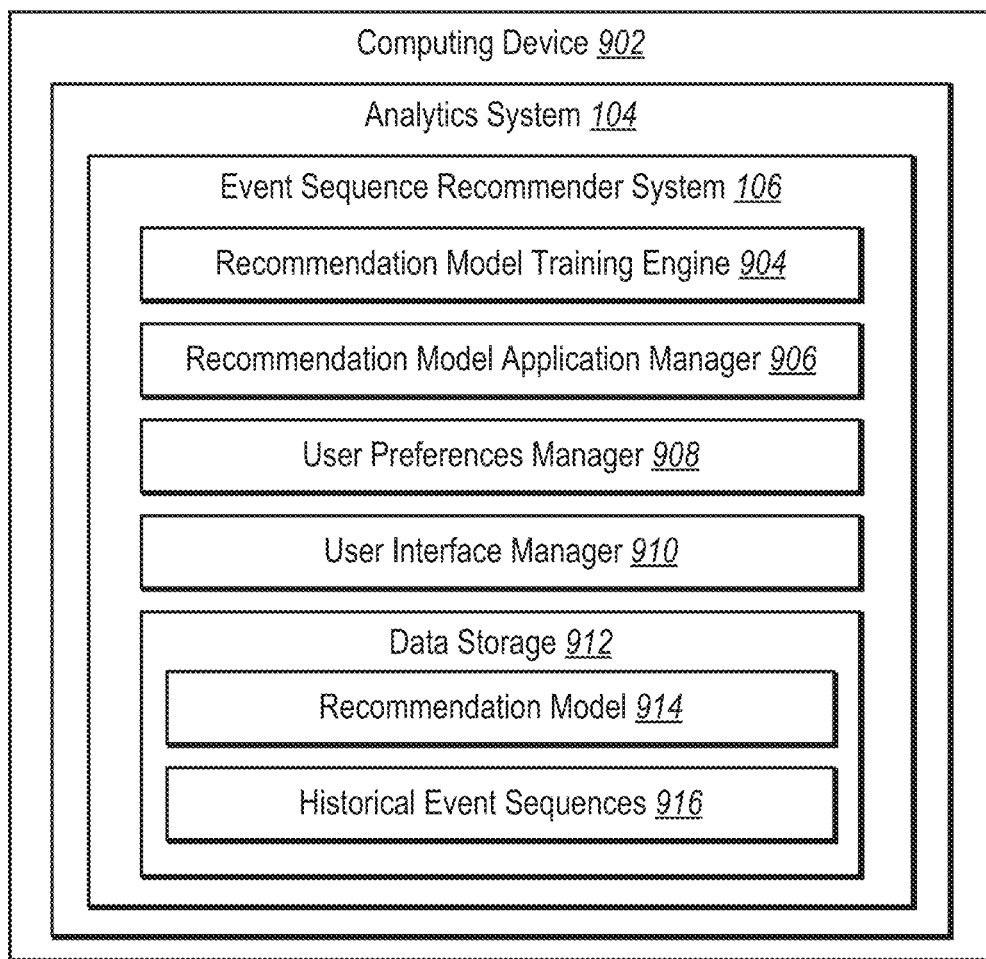
FIG. 9 illustrates an example schematic diagram of an event recommender system in accordance with one or more embodiments

Turning now to FIG. 9, additional detail will be provided regarding various components and capabilities of the event sequence recommender system 106. In particular, FIG. 9 illustrates the event sequence recommender system 106 implemented by the computing device 902 (e.g., the server(s) 802 and/or the client devices 810a-810n as discussed above with reference to FIG. 8). Additionally, the event sequence recommender system 106 is also part of the analytics system 804. As shown, the event sequence recommender system 106 can include, but is not limited to, a recommendation model training engine 904, a recommendation model application manager 906, a user preference manager 908, a user interface manager 910, and data storage 912 (which includes recommendation model 914 and historical event sequences 916).

As just mentioned, and as illustrated in FIG. 9, the event sequence recommender system 106 includes the recommendation model training engine 904. In particular, the recommendation model training engine 904 trains a recommendation model to generate recommended event sequences based on a plurality of historical event sequences. For example, the recommendation model training engine 904 utilizes the plurality of historical event sequences to build a probabilistic suffix tree, parameterize the probabilistic suffix tree into several action models, and construct Markov Decision Process models based on those action models. Subsequently, the recommendation model training engine 904 trains the recommendation to employ Thompson Sampling in conjunction with the Markov Decision Process models to generate recommendations.

As shown in FIG. 9, the event sequence recommender system 106 also includes the recommendation model application manager 906. In particular, the recommendation model application manager 906 uses the recommendation model trained by the recommendation model training engine 904. For example, the recommendation model application manager 906 generates a recommended event sequence from the trained recommendation model based on the plurality of historical event sequences. Further, when the user preferences have been submitted, the recommendation model application manager 906 modifies a reward function of the recommendation model and then uses the recommendation model with the modified reward function to generate a modified recommended event sequence.

Additionally, as shown in FIG. 9, the event sequence recommender system 106 includes the user preferences manager 908. In particular, the user preferences manager 908 detects the input of one or more user preferences (including user constraints) and passes the submitted user preferences to the recommendation model application manager 906. In one or more embodiments, the user preferences manager 908 passes the numerical values associated with the submitted user preferences directly to the recommendation model application manager 906. In some embodiments, the user preferences manager 908 user preferences manager 908 determines a preference weight from the numerical value and sends the preference weight to the recommendation model application manager 906.

Further, as shown in FIG. 9, the event sequence recommender system 106 includes the user interface manager 910. In particular, the user interface manager 910 provides, for display via a client device, a user interface (e.g., the user interface 500 of FIG. 5A) that displays various interface elements. For example, the user interface manager 910 can provide a recommended event sequence, a modified recommended event sequence, a plurality of interactive elements for entry of user preferences, and a visual representation of historical event sequences. Further, the user interface manager 910 can modify the user interface as the inputs user preferences. For example, after receiving one or more user preferences, the user interface manager 910 can modify the visual representation of historical event sequences to display a subset of the plurality of historical event sequences that corresponds to the received user preferences.

Additionally, as shown in FIG. 9, the event sequence recommender system 106 includes data storage 912. In particular, data storage 912 includes recommendation model 914 and historical event sequences 916. Recommendation model 914 stores the recommendation model trained by the recommendation model training engine 904 and applied by the recommendation model application manager 906 to generate recommended event sequences and/or modified recommended event sequences. Historical event sequences 916 stores the plurality of historical event sequences (i.e., the event sequences with which prior users have engaged). The recommendation model training engine 904 can obtain the plurality of historical event sequences from historical event sequences 916 when training the recommendation model.

The components 904-916 and their corresponding elements can comprise software, hardware, or both. For example, the components 904-916 and their corresponding elements can comprise one or more instructions stored on a computer-readable storage medium and executable by processors of one or more computing devices. The components 904-916 and their corresponding elements can comprise hardware, such as a special purpose processing device to perform a certain function or group of functions. Additionally, or alternatively, the components 904-916 and their corresponding elements can comprise a combination of computer-executable instructions and hardware.

Furthermore, the components 904-916 of the event sequence recommender system 106 may, for example, be implemented as one or more stand-alone applications, as one or more modules of an application, as one or more plug-ins, as one or more library functions or functions that may be called by other applications, and/or as a cloud-computing model. Thus, the components 904-916 of the event sequence recommender system 106 may be implemented as a stand-alone application, such as a desktop or mobile application. Furthermore, the components 904-916 of the event sequence recommender system 106 may be implemented as one or more web-based applications hosted on a remote server. Alternatively, or additionally, the components 904-916 of the event sequence recommender system 106 may be implemented in a suite of mobile device applications or "apps." For example, in one or more embodiments, the event sequence recommender system 106 can comprise or operate in connection with digital software applications such as ADOBE® ANALYTICS CLOUD® or ADOBE® MARKETING CLOUD®. "ADOBE," "ANALYTICS CLOUD," and "MARKETING CLOUD" are either registered trademarks or trademarks of Adobe Systems Incorporated in the United States and/or other countries.

Figure 10:
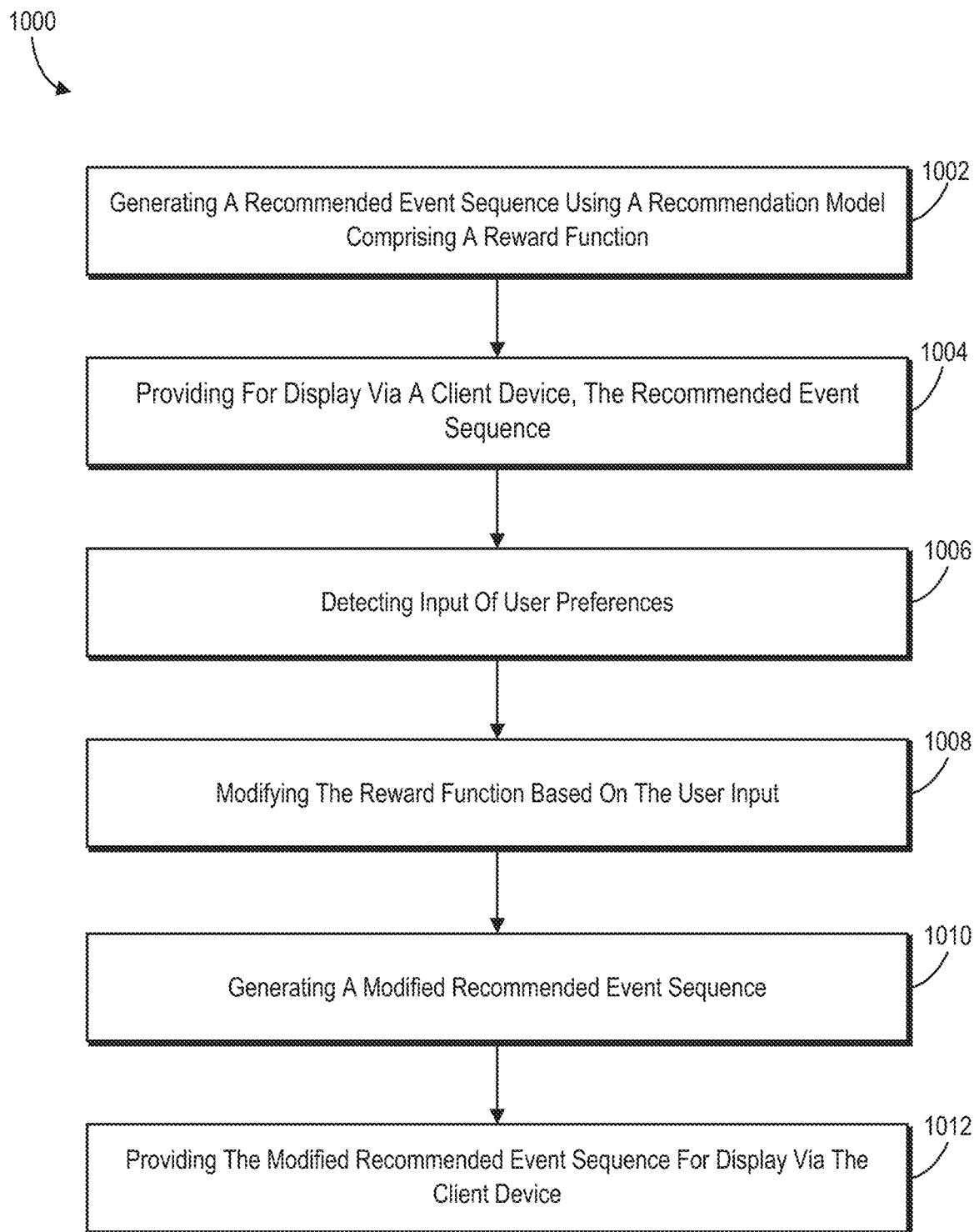
FIG. 10 illustrates a flowchart of a series of acts of generating a modified recommended event sequence based on user preferences in accordance with one or more embodiments.

Turning now to FIG. 10, this figure illustrates a series of acts 1000 performed by the event sequence recommender system 106 to modify a recommended event sequence based on user preferences. While FIG. 10 illustrates acts according to one embodiment, alternative embodiments may omit, add to, reorder, and/or modify any of the acts shown in FIG. 10. The acts of FIG. 10 can be performed as part of a method. In one or more embodiments, a non-transitory computer readable medium can comprise instructions that, when executed by one or more processors, cause a computing device to perform the acts of FIG. 10. In still further embodiments, a system can perform the acts of FIG. 10.

The series of acts 1000 includes an act 1002 of generating a recommended event sequence using a recommendation model comprising a reward function. For example, the act 1002 involves generating a recommended event sequence by utilizing a recommendation model trained based on a plurality of historical event sequences, wherein the recommendation model comprises a reward function. In one or more embodiments, utilizing the recommendation model includes iteratively utilizing a Markov Decision Process model in conjunction with Thompson sampling to generate a sequence of recommended events based on the plurality of historical event sequences. In some embodiments, the recommended event sequence includes a sequence of points of interest. In further embodiments, the recommended event sequence includes a sequence of digital content transmissions across client devices.

The series of acts 1000 also includes an act 1004 of providing, for display via a client device, the recommended event sequence. For example, the act 1004 involves providing, for display via a client device, a user interface comprising the recommended event sequence, a visual representation of historical event sequences, and a plurality of interactive elements for entry of user preferences. In one or more embodiments, the visual representation of historical event sequences includes a subset of the plurality of historical event sequences. In some embodiments, the visual representation of historical event sequences includes a plurality of rows—wherein each row represents a historical event sequence of the plurality of historical event sequences taken by a user—and a plurality of a columns—wherein each column represents an event within the historical event sequence.

In one or more embodiments (e.g., where the recommended event sequence includes a sequence of points of interest), a user preference of the user preferences comprises one of a preferred point of interest category or a preferred point of interest. In some embodiments (e.g., where the recommended event sequence includes a sequence of digital content transmissions across client devices), a user preference of the user preferences comprises one of a distribution channel, a digital content category, or a digital content item for transmission.

In some embodiments, the plurality of interactive elements further includes a set of interactive elements for entry of user constraints. In one or more embodiments (e.g., where the recommended event sequence includes a sequence of points of interest), a user constraint of the user constraints comprises one of a maximum time, a maximum distance, or a maximum number of points of interest to visit. In some embodiments (e.g., where the recommended event sequence includes a sequence of digital content transmissions across client devices), a user constraint of the user constraints comprises a maximum number of digital content transmissions.

The series of acts 1000 further includes an act 1006 of detecting input of user preferences. For example, the act 1006 involves detecting input of user preferences via the plurality of interactive elements. In one or more embodiments, detecting input of user preferences includes generating preference weights based on the detected input of user preferences via the plurality of interactive elements.

The series of acts 1000 also includes an act 1008 of modifying the reward function based on the user input. For example, the act 1008 involves modifying the reward function of the recommendation model based on the input of the user preferences. In one or more embodiments, modifying the reward function includes modifying the reward function of the recommendation model by applying the preference weights to the reward function.

Additionally, the series of acts 1000 includes an act 1010 of generating a modified recommended event sequence. For example, the act 1010 involves generating a modified recommended event sequence based on the recommendation model and the modified reward function. In one or more embodiments, the act 1010 further involves generating the modified recommended event sequence further based on input of one or more user constraints via the set of interactive elements Further, the series of acts 1000 includes an act 1012 of providing the modified recommended event sequence for display via the client device. For example, the act 1012 involves providing the modified recommended event sequence for display via the client device with the plurality of interactive elements for additional entry of user preferences. In one or more embodiments, the event sequence recommender system 106 provides the modified recommended event sequence for display by providing a first visual indicator—representing historical user responses corresponding to an event of the modified recommended event sequence—and providing a second visual indicator—representing a type of the event. In one or more embodiments, the event sequence recommender system 106 provides the recommended event sequence for display with the modified recommended event sequence via the client device. In other words, the event sequence recommender system 106 provides the unmodified recommendation and the modified recommendation for simultaneous display.

In one or more embodiments, the series of acts 1000 further includes modifying the visual representation of historical event sequences to display a subset of the plurality of historical event sequences corresponding to the user preferences (not shown). In some embodiments, the series of acts 1000 further includes iteratively generating modified recommended event sequences by modifying the reward function of the recommendation model based on detecting user preferences via the plurality of interactive elements (not shown). In particular, in response to detecting additional entry of user preferences (e.g., a user submits the user preferences in successive iterations), the event sequence recommender system 106 can further modify the reward function and generate a new modified recommended event sequence. Consequently, the series of acts 1000 can further include iteratively modifying the visual representation of historical event sequences to display subsets of the plurality of historical event sequences corresponding to the user preferences.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
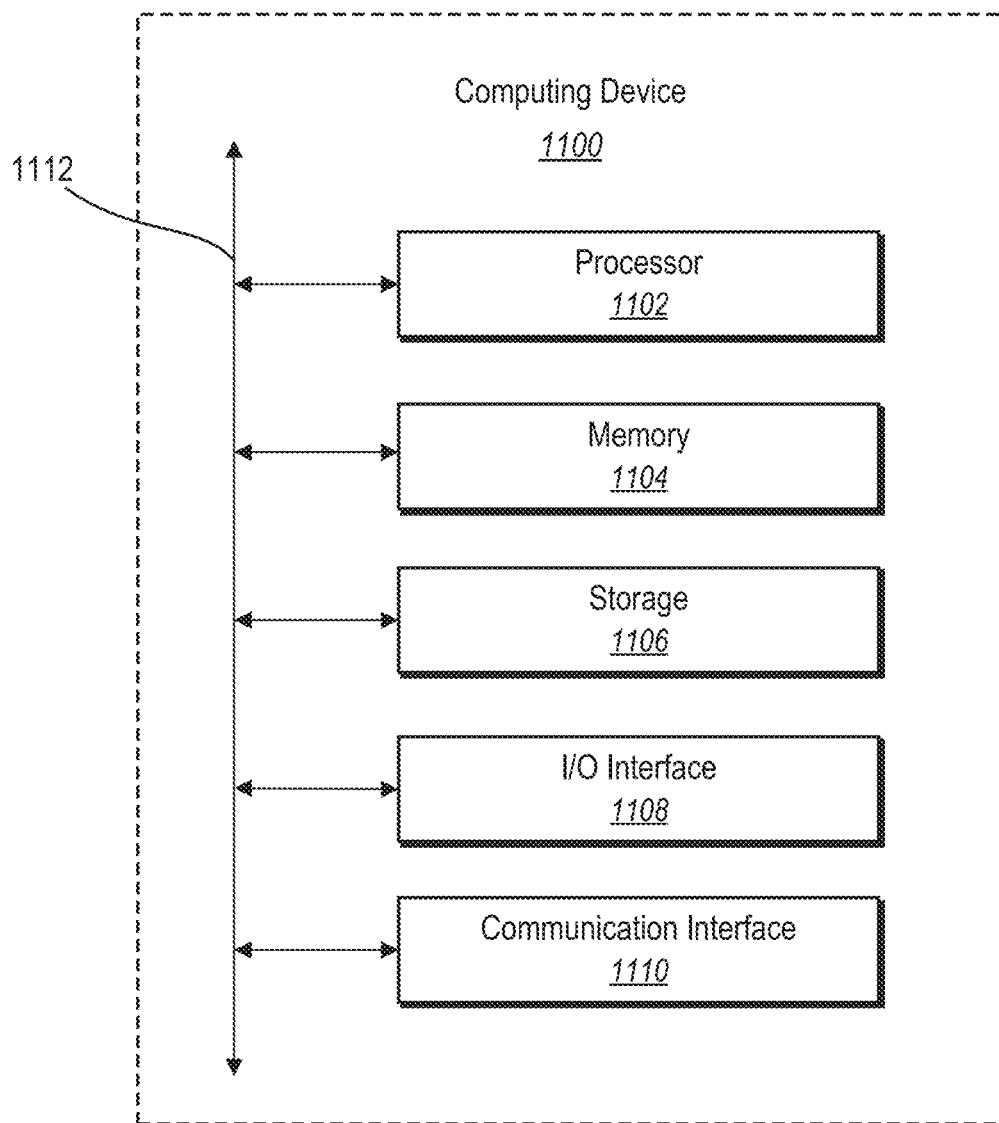
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that server(s) 802 and/or client devices 810a-810n may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, computing device 1100 can include fewer components than those shown in FIG. 11. Components of computing device 1100 shown in FIG. 11 will now be described in additional detail.

In particular embodiments, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage device 1106 and decode and execute them. In particular embodiments, processor 1102 may include one or more internal caches for data, instructions, or addresses. As an example, and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example, and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular embodiments, storage device 1106 is non-volatile, solid-state memory. In other embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, for a user of a client device, a popular event sequence based on a frequency of use of event sequences by a plurality of prior users represented in a plurality of historical event sequences;

generating a recommended event sequence by using a recommendation machine learning model to select an event sequence for recommendation based on a reward function having a plurality of parameters that were learned during multiple training iterations to provide expected values of recommendations, the recommended event sequence corresponding to a general recommendation provided to client devices users as a default;

receiving, from the client device, one or more user preferences with respect to one or more events by receiving at least one user interaction with one or more interactive elements corresponding to the one or more events via a graphical user interface of the client device;

generating a modified recommended event sequence using the recommendation machine learning model by modifying the reward function to include a weighting factor that modifies the plurality of parameters of the reward function via one or more preference weights that represent the one or more user preferences to modify how the recommendation machine learning model selects the event sequence for recommendation without retraining the recommendation machine learning model; and providing, for simultaneous display within the graphical user interface on the client device, the recommended event sequence, the modified recommended event sequence, and the popular event sequence.

2. The computer-implemented method of claim 1, further comprising:

receiving, from the client device, one or more user constraints that place a limitation on at least one event by receiving one or more user interactions with one or more additional interactive elements; and modifying the reward function of the recommendation machine learning model based on the one or more user constraints.

3. The computer-implemented method of claim 1, further comprising:

determining a first expected value score corresponding to the modified recommended event sequence using the modified reward function; and providing, for display within the graphical user interface on the client device, the first expected value score in conjunction with the modified recommended event sequence.

4. The computer-implemented method of claim 3, further comprising:
  determining, using the modified reward function, a second expected value score corresponding to the popular event sequence;
  determining, using the modified reward function, a third expected value score corresponding to the recommended event sequence; and
  providing, for display within the graphical user interface on the client device, the second expected value score in conjunction with the popular event sequence and the third expected value score in conjunction with the recommended event sequence.

5. The computer-implemented method of claim 1, wherein modifying the reward function of the recommendation machine learning model to introduce the weighting factor that modifies the plurality of parameters of the reward function via the one or more preference weights that represent the one or more user preferences comprises providing a preference weight to each of the plurality of parameters of the reward function where each preference weight represents a corresponding user preference.

6. The computer-implemented method of claim 1, further comprising:
  providing, for display within the graphical user interface on the client device, a first set of visual indicators corresponding to events of the recommended event sequence;
  providing, for display within the graphical user interface on the client device, a second set of visual indicators corresponding to events of the modified recommended event sequence; and
  providing, for display within the graphical user interface on the client device, a third set of visual indicators corresponding to events of the popular event sequence.

7. The computer-implemented method of claim 6, further comprising determining that a first event from the events of the modified recommended event sequence is more frequently used by the plurality of prior users than a second event from the events of the modified recommended event sequence,
  wherein providing the third set of visual indicators corresponding to the events of the modified recommended event sequence comprises providing a first visual indicator corresponding to the first event having a larger size than a second visual indicator corresponding to the second event based on determining that the first event is more frequently used than the second event.

8. The computer-implemented method of claim 1, wherein:
  receiving the one or more user preferences comprises receiving at least one of a preferred point of interest category or a preferred point of interest; and
  generating the modified recommended event sequence based on the one or more user preferences comprises generating the modified recommended event sequence to include at least one of a point of interest associated with the preferred point of interest category or to include the preferred point of interest.

9. The computer-implemented method of claim 1, further comprising:
  receiving, from an additional client device, one or more additional user preferences with respect to the one or more events;
  generating, utilizing the recommendation machine learning model, an additional modified recommended event sequence based on the one or more additional user preferences; and
  providing, for display within a graphical user interface on the additional client device, the recommended event sequence, the additional modified recommended event sequence, and the popular event sequence.

10. A non-transitory computer-readable medium storing instructions thereon that, when executed by at least one processor, cause the at least one processor to perform operations comprising:
  generating, for a user of a client device, a popular event sequence based on a frequency of use of event sequences by a plurality of users represented in a plurality of historical event sequences;
  generating a recommended event sequence by using a recommendation machine learning model to select an event sequence for recommendation based on a reward function having a plurality of parameters that were learned during multiple training iterations to provide expected values of recommendations, the recommended event sequence corresponding to a general recommendation provided to client device users as a default;
  providing, for display within a graphical user interface of the client device, the popular event sequence, the recommended event sequence, and a plurality of interactive elements for entry of user preferences events;
  determining one or more user preferences with respect to one or more events based on receiving at least one user interaction with the plurality of interactive elements via the graphical user interface of the client device; and
  in response to determining the one or more user preferences:
    generating a modified recommended event sequence using the recommendation machine learning model by modifying the reward function to include a weighting factor that modifies that plurality of parameters of the reward function via one or more preference weights that represent the one or more user preferences to modify how the recommendation machine learning model selects the event sequence for recommendation without retraining the recommendation machine learning model; and
    modifying the graphical user interface of the client device to simultaneously display the recommended event sequence, the modified recommended event sequence, and the popular event sequence.

11. The non-transitory computer-readable medium of claim 10, wherein the operations further comprise:
  providing, for display within the graphical user interface of the client device, a visual representation of historical event sequences from the plurality of historical event sequences that correspond to the recommended event sequence; and
  modifying, in response to determining the one or more user preferences, the graphical user interface of the client device to display a visual representation of a subset of historical event sequences from the plurality of historical event sequences that correspond to the one or more user preferences.

12. The non-transitory computer-readable medium of claim 10, wherein the operations further comprise:
  providing, for display within the graphical user interface of the client device, a map display that displays a plurality of points of interest associated with the recommended event sequence or the popular event sequence and a recommended trajectory for visiting the plurality of points of interest; and modifying, in response to determining the one or more user preferences, the map display to display points of interest associated with the modified recommended event sequence and a recommended trajectory for visiting the points of interest.

13. The non-transitory computer-readable medium of claim 10, wherein the operations further comprise:
   providing, for display within the graphical user interface of the client device, a set of additional interactive elements for entry of user constraints corresponding to at least one recommended event sequence; and
   generating, utilizing the recommendation machine learning model, the modified recommended event sequence further based on one or more user constraints selected via the set of additional interactive elements.

14. The non-transitory computer-readable medium of claim 13, wherein providing the set of additional interactive elements for entry of the user constraints comprises providing an interactive element corresponding to a constraint on a number of events included in the at least one recommended event sequence, a constraint on a time required to complete the at least one recommended event sequence, or a constraint on a travel distance for completing the at least one recommended event sequence.

15. The non-transitory computer-readable medium of claim 10, wherein the operations further comprise:
   determining that a first event of the modified recommended event sequence corresponds to a first event category;
   determining that a second event of the modified recommended event sequence corresponds to a second event category; and
   providing, for display within the graphical user interface of the client device, a set of visual indicators corresponding to the modified recommended event sequence, the set of visual indicators comprising a first visual indicator having a first color corresponding to the first event category and a second visual indicator having a second color corresponding to the second event category.

16. The non-transitory computer-readable medium of claim 10, wherein generating the popular event sequence based on the plurality of historical event sequences comprises:
   determining a plurality of frequencies that indicate a representation of each historical event sequence within the plurality of historical event sequences; and
   generating the popular event sequence utilizing one or more comparisons of the plurality of frequencies.

17. A system comprising:
   at least one memory device comprising a recommendation machine learning model that includes a reward function having a plurality of parameters that were learned during multiple training iterations to indicate expected values of recommendations; and
   at least one processor configured to cause the system to:
      determine frequencies of use associated with a plurality of historical event sequences previously used by a plurality of users of a plurality of client devices;
      generate, for a user of a client device, a popular event sequence based on the frequencies of use associated with the plurality of historical event sequences;
      generate a recommended event sequence by using the recommendation machine learning model to select an event sequence for recommendation based on the reward function, the recommended event sequence corresponding to a general recommendation provided to client device users as a default;
      receive, from the client device, one or more user preferences with respect to one or more events by receiving at least one user interaction with one or more interactive elements corresponding to the one or more events via a graphical user interface of the client device;
      generate a modified recommended event sequence using the recommendation machine learning model by modifying the reward function to include a weighting factor that modifies the plurality of parameters of the reward function via one or more preference weights that represent the one or more user preferences to modify how the recommendation machine learning model selects the event sequence for recommendation without retraining the recommendation machine learning model; and
      provide, for simultaneous display within the graphical user interface on the client device, the recommended event sequence, the modified recommended event sequence, and the popular event sequence.

18. The system of claim 17, wherein:
   modifying the reward function of the recommendation machine learning model to introduce the weighting factor that modifies the plurality of parameters of the reward function via the one or more preference weights that represent the one or more user preferences comprises providing a preference weight to each of the plurality of parameters of the reward function where each preference weight represents a corresponding user preference; and
   the at least one processor is configured to cause the system to generate, utilizing the recommendation machine learning model, the modified recommended event sequence comprises generating the modified recommended event sequence utilizing the recommendation machine learning model with the modified reward function having the preference weight added to each of the plurality of parameters.

19. The system of claim 18, wherein the at least one processor is further configured to cause the system to:
   determine, utilizing the modified reward function, a first expected value score corresponding to the modified recommended event sequence, a second expected value score corresponding to the popular event sequence, and a third expected value score corresponding to the recommended event sequence; and
   provide, for display within the graphical user interface on the client device, the first expected value score, the second expected value score, and the third expected value score.

20. The system of claim 17, wherein the at least one processor is further configured to cause the system to, in response to receiving the one or more user preferences:
   generate a visual representation of one or more historical event sequences from the plurality of historical event sequences that correspond to the one or more user preferences; and
   provide the visual representation for display within the graphical user interface.

* * * * *